(12) United States Patent
Davis et al.

(10) Patent No.: US 11,674,581 B2
(45) Date of Patent: Jun. 13, 2023

(54) DUAL SENSOR SYSTEM AND METHOD FOR A DIFFERENTIAL DISCONNECT AXLE ASSEMBLY

(71) Applicant: Dana Automotive Systems Group, LLC, Maumee, OH (US)

(72) Inventors: Justin S. Davis, Maumee, OH (US); Michael Z. Creech, Ann Arbor, MI (US); Sagar B. Bangar, Ypsilanti, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 17/650,205

(22) Filed: Feb. 7, 2022

(65) Prior Publication Data

US 2022/0325786 A1 Oct. 13, 2022

Related U.S. Application Data

(60) Provisional application No. 63/261,461, filed on Sep. 21, 2021, provisional application No. 63/172,561, filed on Apr. 8, 2021.

(51) Int. Cl.
*F16H 48/34* (2012.01)
*F16H 48/24* (2006.01)
*F16H 48/20* (2012.01)
*F16D 27/00* (2006.01)

(52) U.S. Cl.
CPC ............ *F16H 48/34* (2013.01); *F16H 48/24* (2013.01); *F16D 2027/002* (2013.01); *F16D 2300/18* (2013.01); *F16H 2048/204* (2013.01); *F16H 2048/346* (2013.01)

(58) Field of Classification Search
CPC ........... F16D 2300/18; F16D 2027/002; F16D 27/10; F16D 27/108–118; F16H 48/24; F16H 48/34; F16H 2048/346
See application file for complete search history.

(56) References Cited

U.S. PATENT DOCUMENTS

| 7,425,185 | B2 * | 9/2008 | Donofrio | F16H 48/08 475/231 |
|---|---|---|---|---|
| 7,837,585 | B2 * | 11/2010 | Pinkos | B60K 17/16 475/150 |
| 8,808,127 | B2 | 8/2014 | Seidl et al. | |
| 9,625,026 | B2 * | 4/2017 | Cochren | F16H 48/24 |
| 10,184,846 | B2 * | 1/2019 | Lu | G01D 3/0365 |
| 10,520,334 | B2 | 12/2019 | Creech et al. | |
| 10,711,849 | B2 * | 7/2020 | Inose | F16H 48/32 |
| 10,851,843 | B2 * | 12/2020 | Shibata | F16D 11/10 |
| 11,142,067 | B2 | 10/2021 | Creech et al. | |
| 2020/0292356 | A1 * | 9/2020 | McGraner | F16H 48/34 |

* cited by examiner

*Primary Examiner* — Ernesto A Suarez
*Assistant Examiner* — James J Taylor, II
(74) *Attorney, Agent, or Firm* — McCoy Russell LLP

(57) ABSTRACT

Methods and systems for a locking differential are provided. The locking differential system includes an electromagnetic solenoid actuator configured to induce locking and unlocking of the differential and a circuit board assembly designed to programmatically control the locking and unlocking functionality. The circuit board assembly includes a multi-sensor sub-assembly having two or more sensor configured to monitor a position of the electromagnetic solenoid actuator.

6 Claims, 13 Drawing Sheets

DUAL SENSOR SYSTEM AND METHOD FOR A DIFFERENTIAL DISCONNECT AXLE ASSEMBLY

CROSS REFERENCE TO RELATED APPLICATIONS

The present application claims priority to U.S. Provisional Application No. 63/172,561, entitled "MULTI-SENSOR POSITION SENSING SYSTEM AND METHOD FOR A DIFFERENTIAL DISCONNECT AXLE ASSEMBLY", and filed on Apr. 8, 2021 and to U.S. Provisional Application No. 63/261,461, entitled "DUAL SENSOR SYSTEM AND METHOD FOR A DIFFERENTIAL DISCONNECT AXLE ASSEMBLY", and filed on Sep. 21, 2021. The entire contents of the above-listed applications are hereby incorporated by reference for all purposes.

TECHNICAL FIELD

The present disclosure generally relates to a locking differential assembly in a vehicle. More particularly, the present disclosure relates to an actuator as well as control and sensing circuitry of the actuator.

BACKGROUND AND SUMMARY

Some drivetrains include differentials with locking capabilities which when activated, prevent speed differentiation between drive wheels. In certain locking differentials, electronic actuators are used, owing in part to their quicker actuation times and increased durability in comparison to certain pneumatic locking systems and other types of locking mechanisms.

Differential drive assemblies having a single input drive and two output drives are typically configured to connect and disconnect at least one of the two outputs. The connect/disconnect actuator usually includes an actuator, such as a solenoid, and a sensing method that is used to determine whether the present state is connected or disconnected. This sensing method is difficult to achieve with high accuracy, which is generally required in a safety-sensitive environment.

To overcome such challenges, a differential system is provided. The system, in one example, comprises an electromagnetic solenoid actuator that includes a coil assembly and a piston. The piston is configured to selectively induce locking and unlocking of axle shaft speed differentiation in the differential. The system further comprises a circuit board assembly having control circuitry that is configured to programmatically control the electromagnetic solenoid actuator. The system also includes two or more sensors that are configured to sense a position of the piston, which may be adjusted between different physical positions, and may radially extend down a face of the coil assembly. In an example, two distinct sensors each provide an output, with each output indicating one of two sensed positions. The two sensors may be configured to switch between the two sensed positions at the different physical positions, with one of the two sensors configured to detect a first, locked, position and the other of the two sensors configured to detect a second, unlocked position, but still each sensor providing information about only two states/positions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A differential system with an electronic locking mechanism and control strategy for the locking mechanism is described herein. The differential system includes a circuit assembly with a control board and two or more actuator sensors, where the circuit assembly may be configured to communicate a current vehicle status according to the two or more actuator sensors to a vehicle control unit. In certain embodiments, the control board and sensors form a common structure that is coupled to the locking mechanism's electronic actuator. In other embodiments, one or more of the sensors may be positioned separate from the control board. In yet other embodiments, a multi-sensor assembly, e.g., including the two or more distinct actuator sensors, may be a multi-sensor system, which may be implemented in various configurations according to packaging and cost demands as well as a desired robustness.

Figure 1:
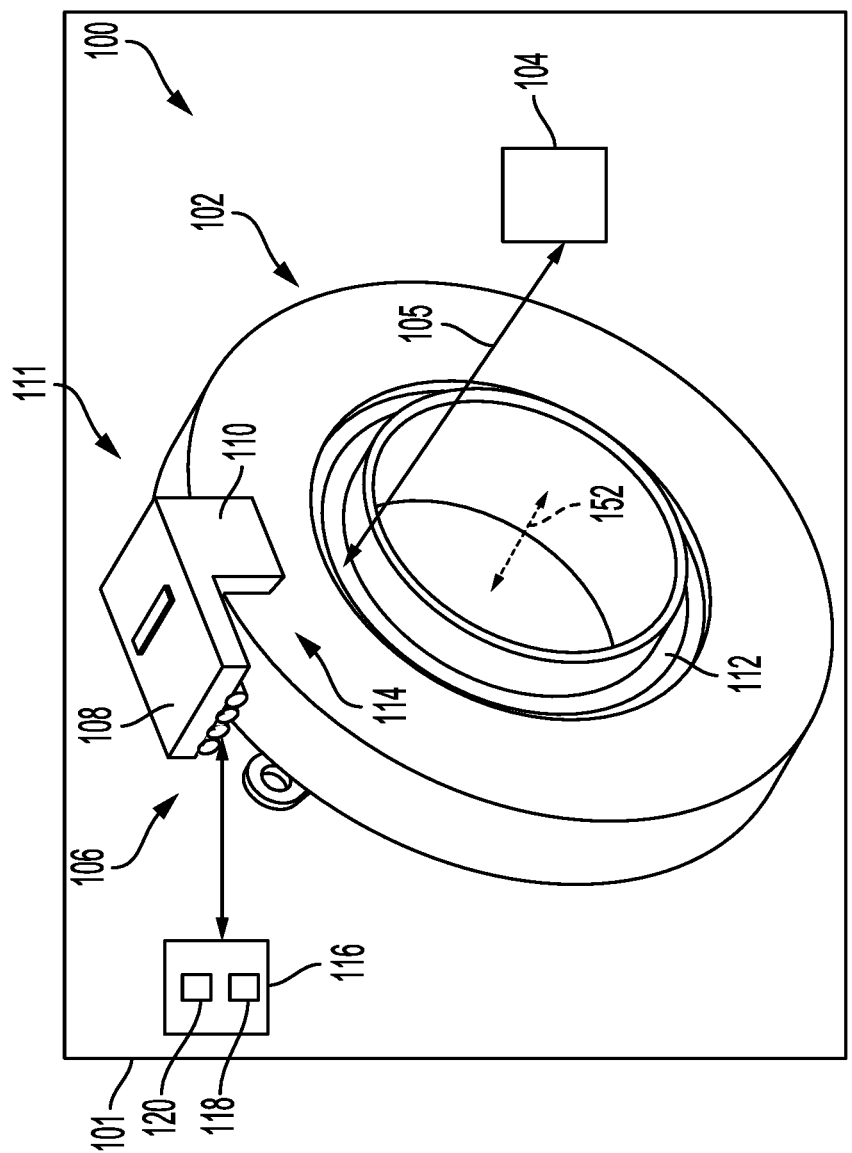
FIG. 1 shows an illustration of an embodiment of a differential system with a circuit board assembly.
Figure 2:
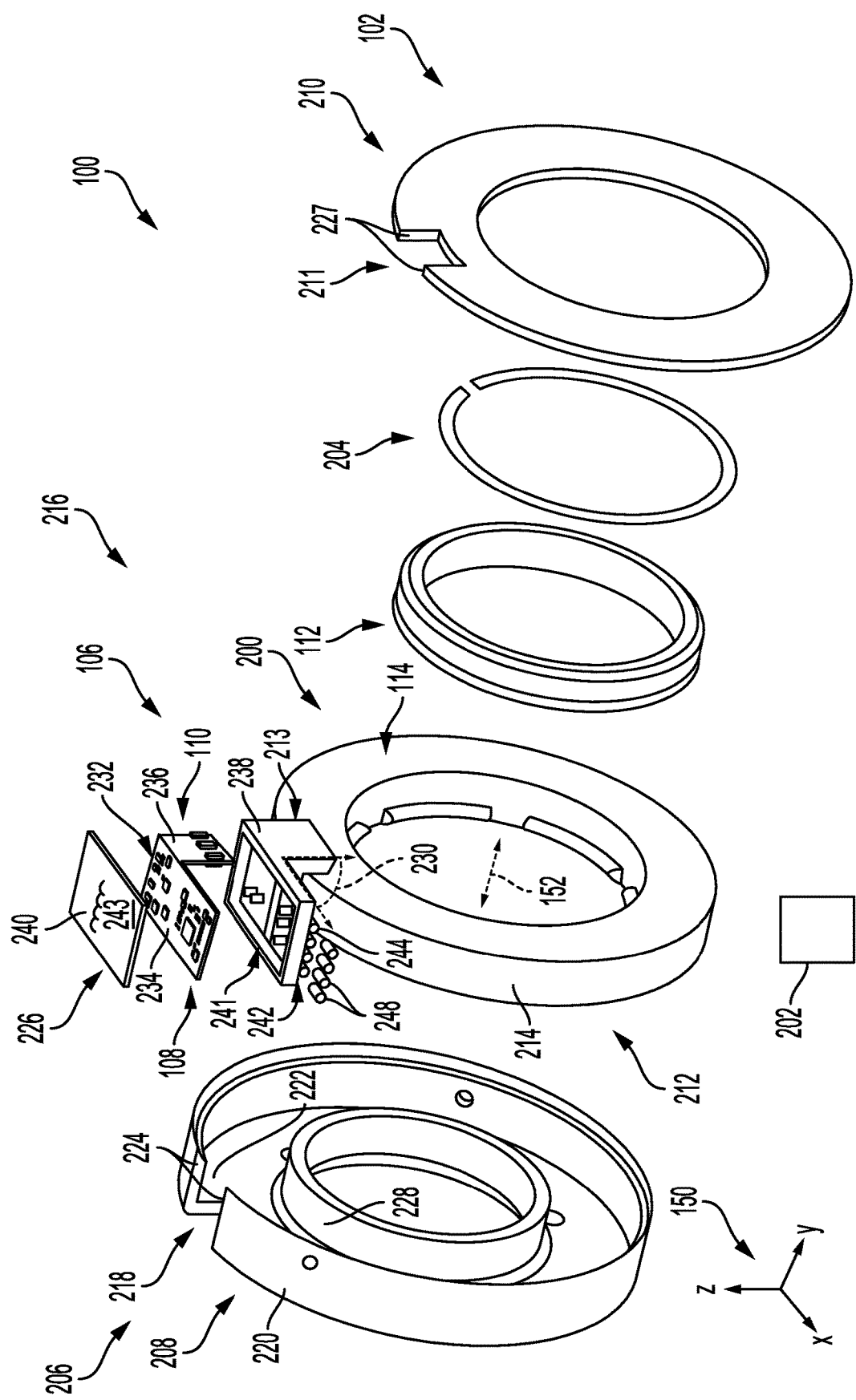
FIG. 2 shows an exploded view of the differential system and circuit board assembly, depicted in FIG. 1.
Figure 3:
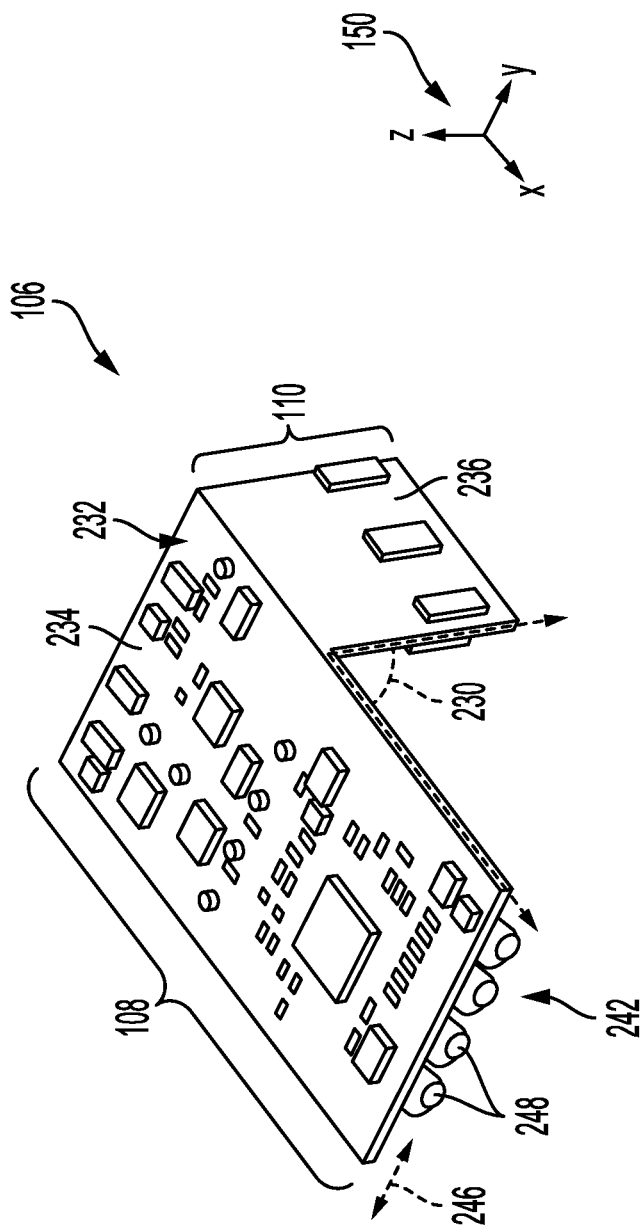
FIG. 3 shows a detailed view of the circuit board, depicted in FIG. 2.
Figure 4:
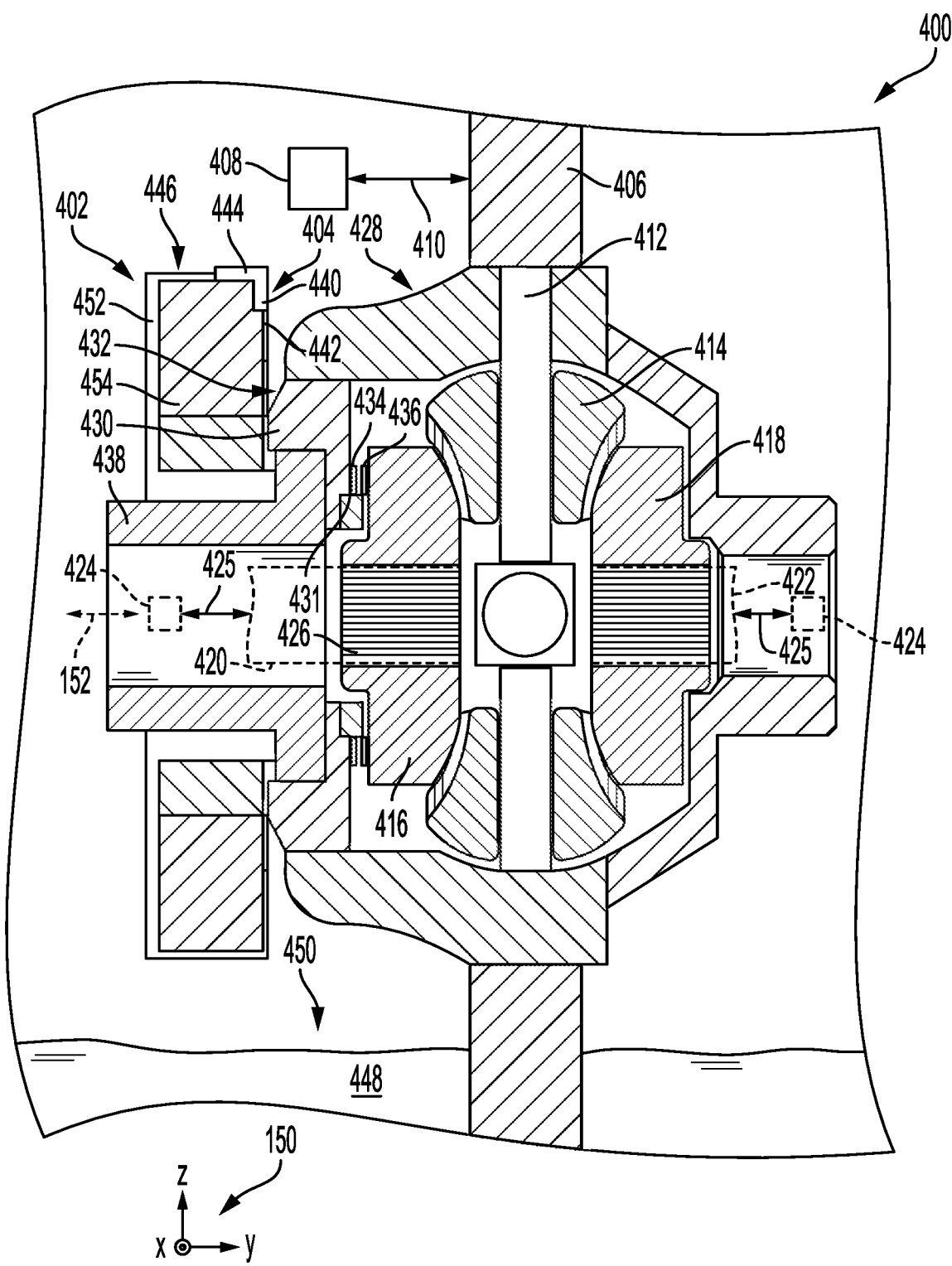
FIG. 4 shows a cross-sectional view of a use-case differential incorporating the circuit board assembly, depicted in FIGS. 1-3.
Figure 9:
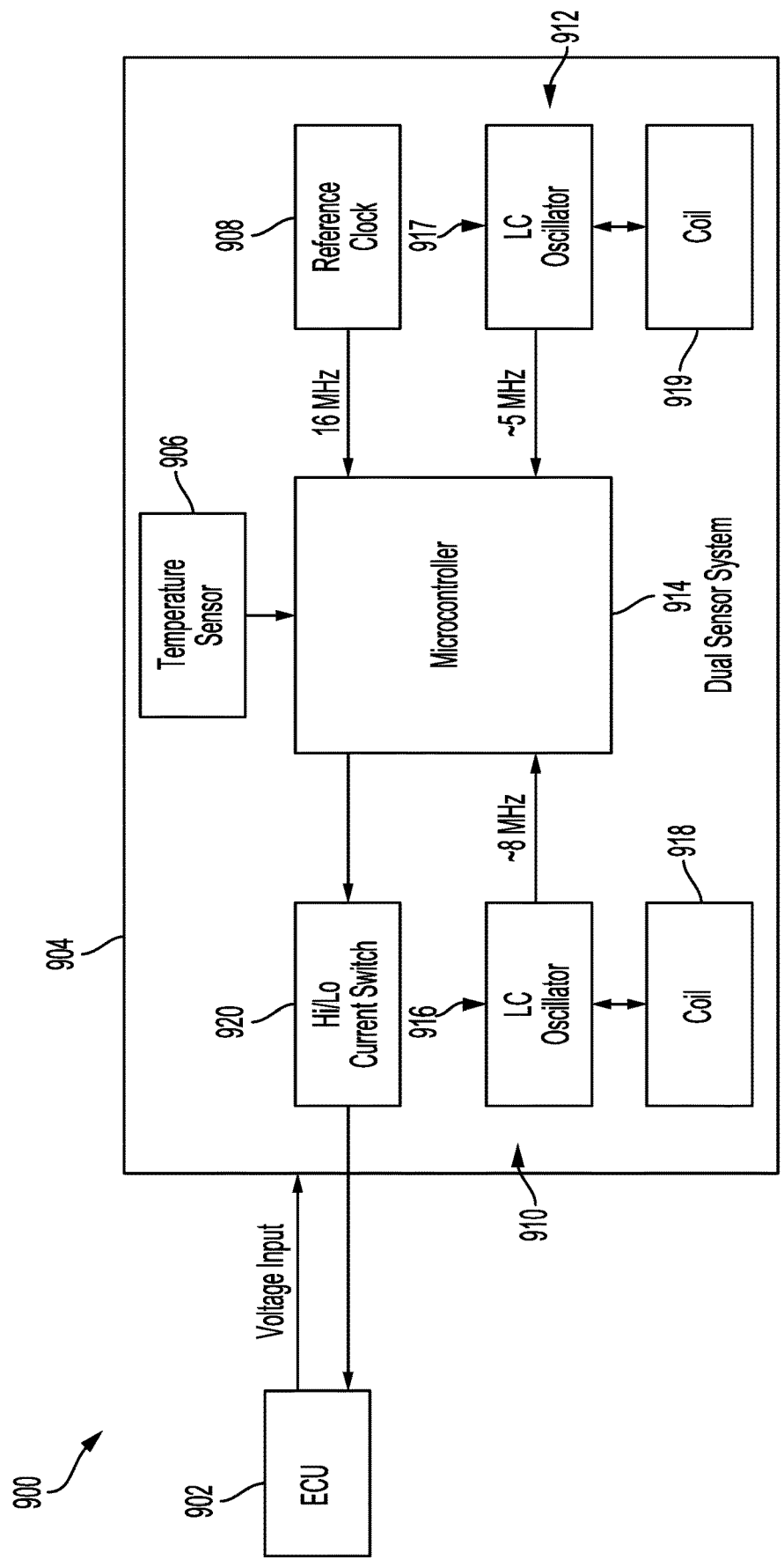
FIG. 9 shows a first example of a multi-sensor system for a multi-sensor sub-assembly of a circuit board assembly, such as the circuit board assembly of FIGS. 1-4.
Figure 10:
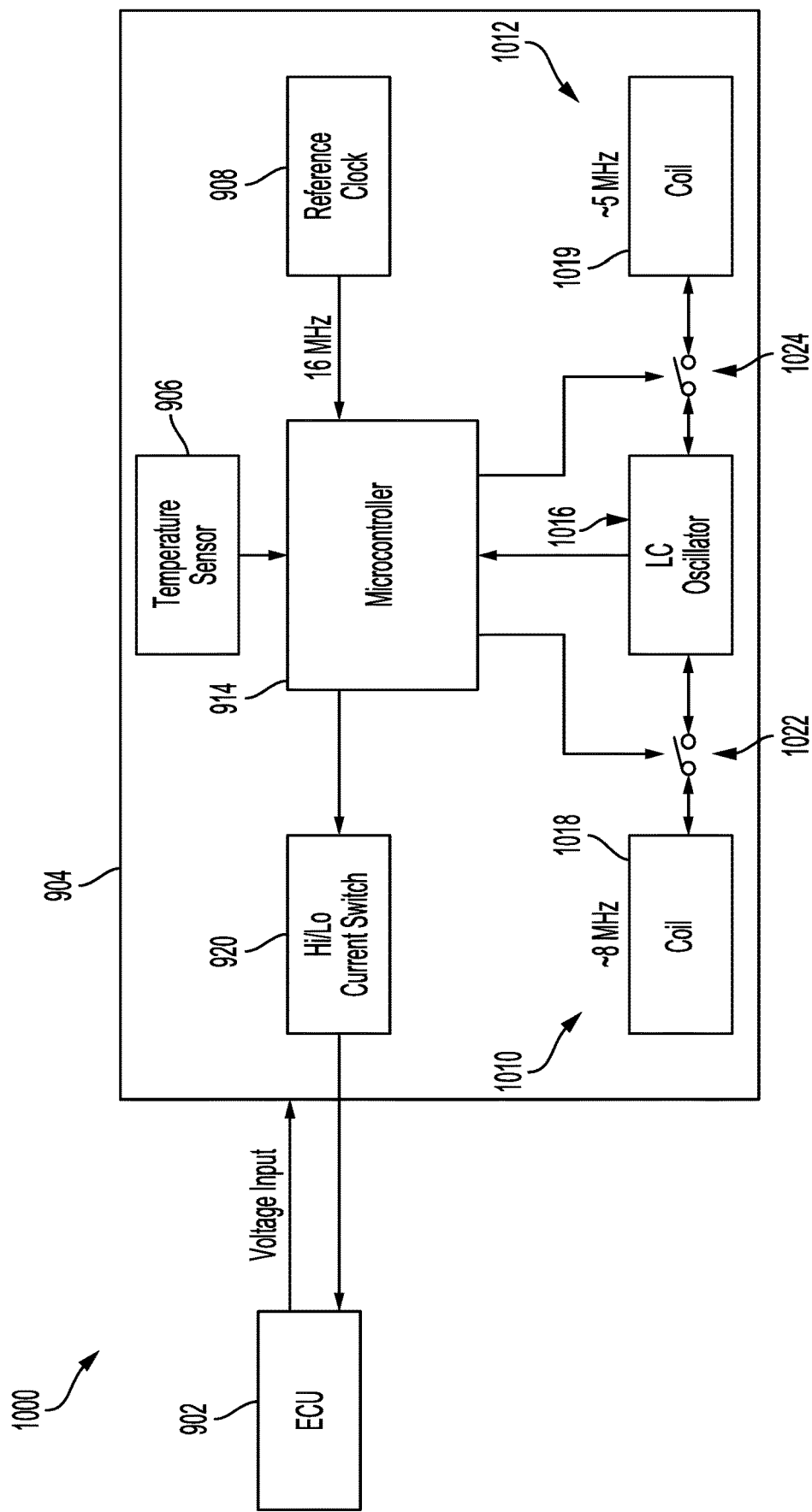
FIG. 10 shows a second example of a multi-sensor system.
Figure 11:
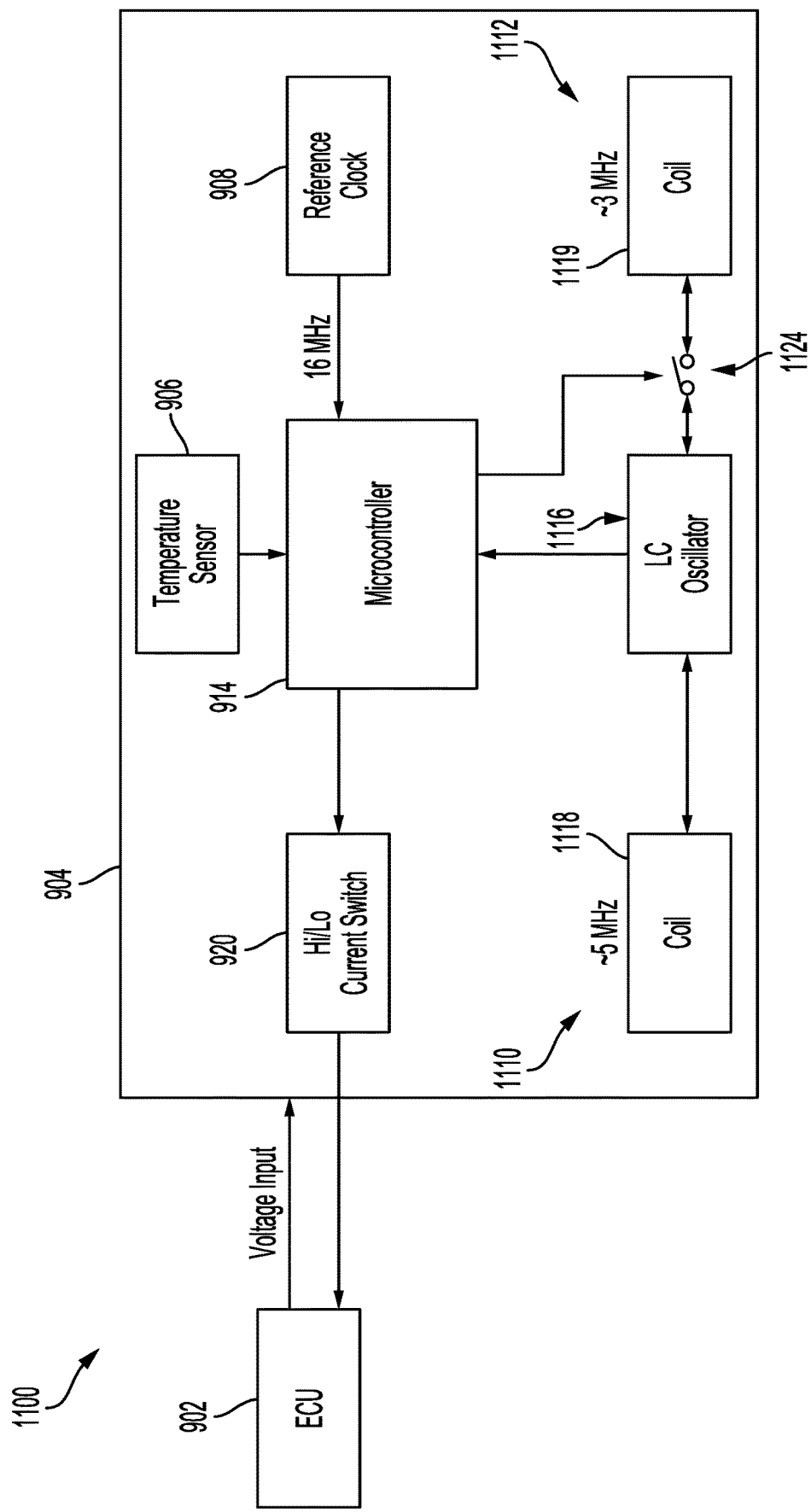
FIG. 11 shows a third example of a multi-sensor system.
Figure 12:
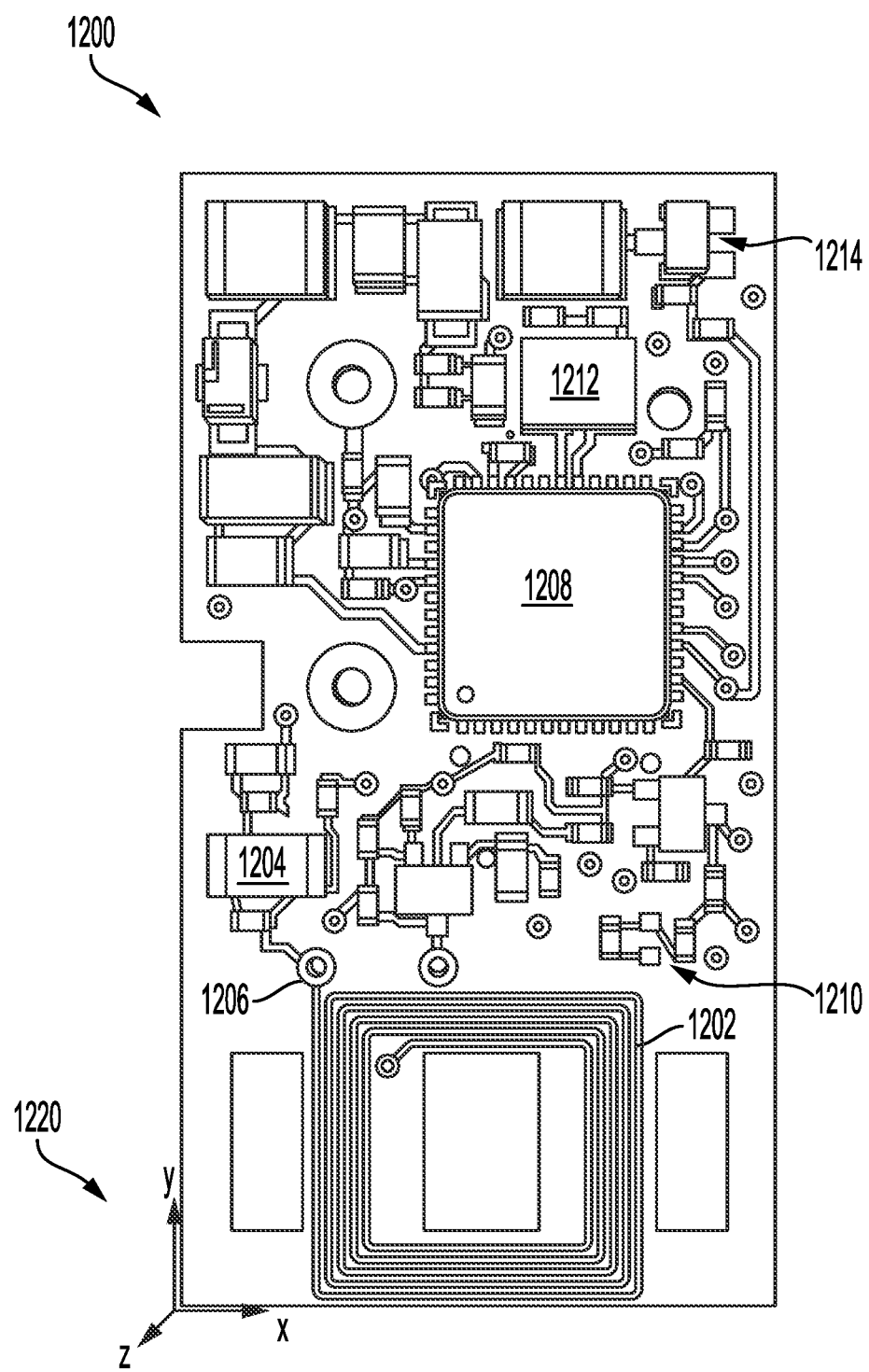
FIG. 12 shows an example multi-sensor sub-assembly of a circuit board assembly, such as the circuit board assembly of FIGS. 1-4.
Figure 13:
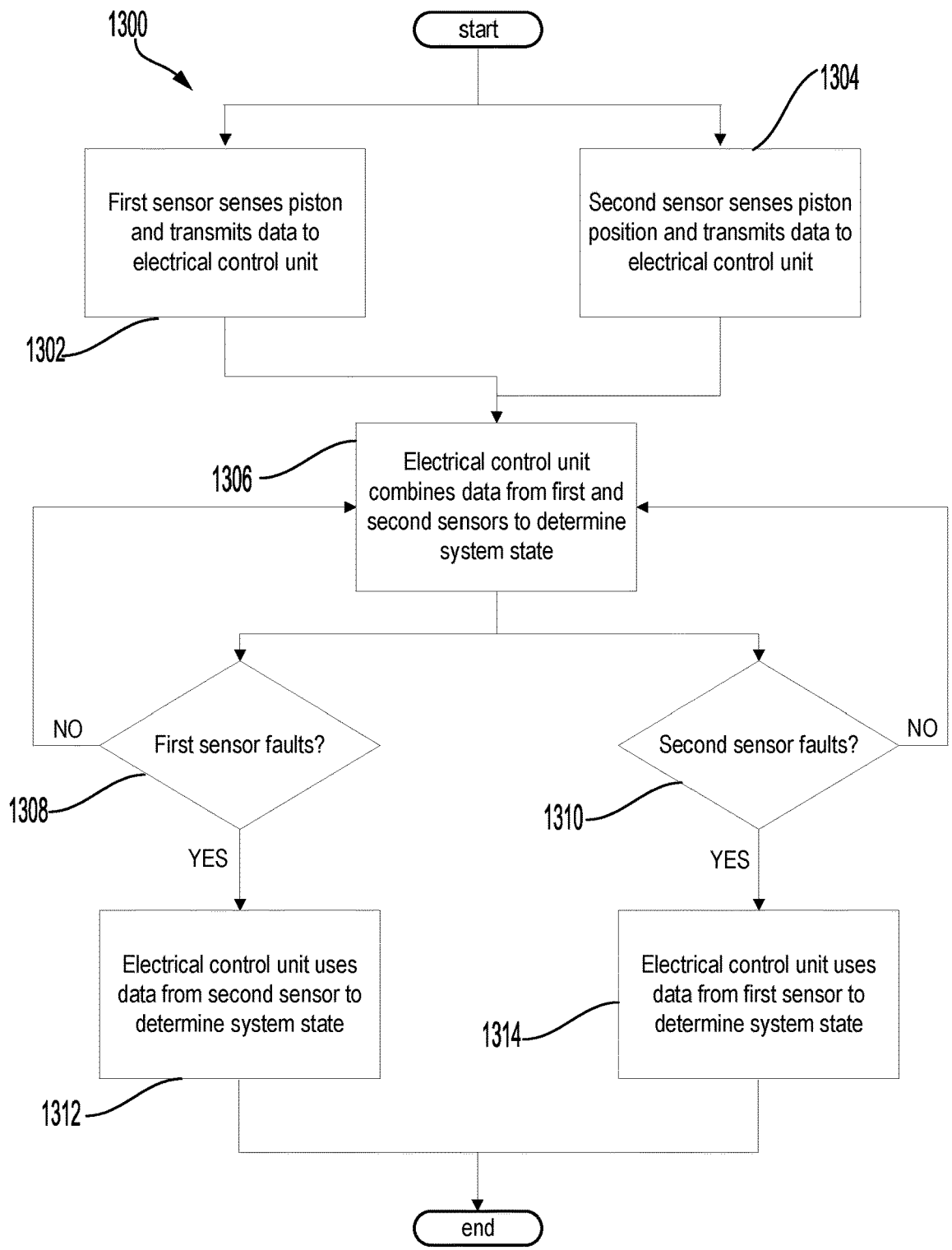
FIG. 13 shows a flowchart for a high-level method of operating a multi-sensor position sensing system for a differential disconnect axle assembly.
Figure 14:
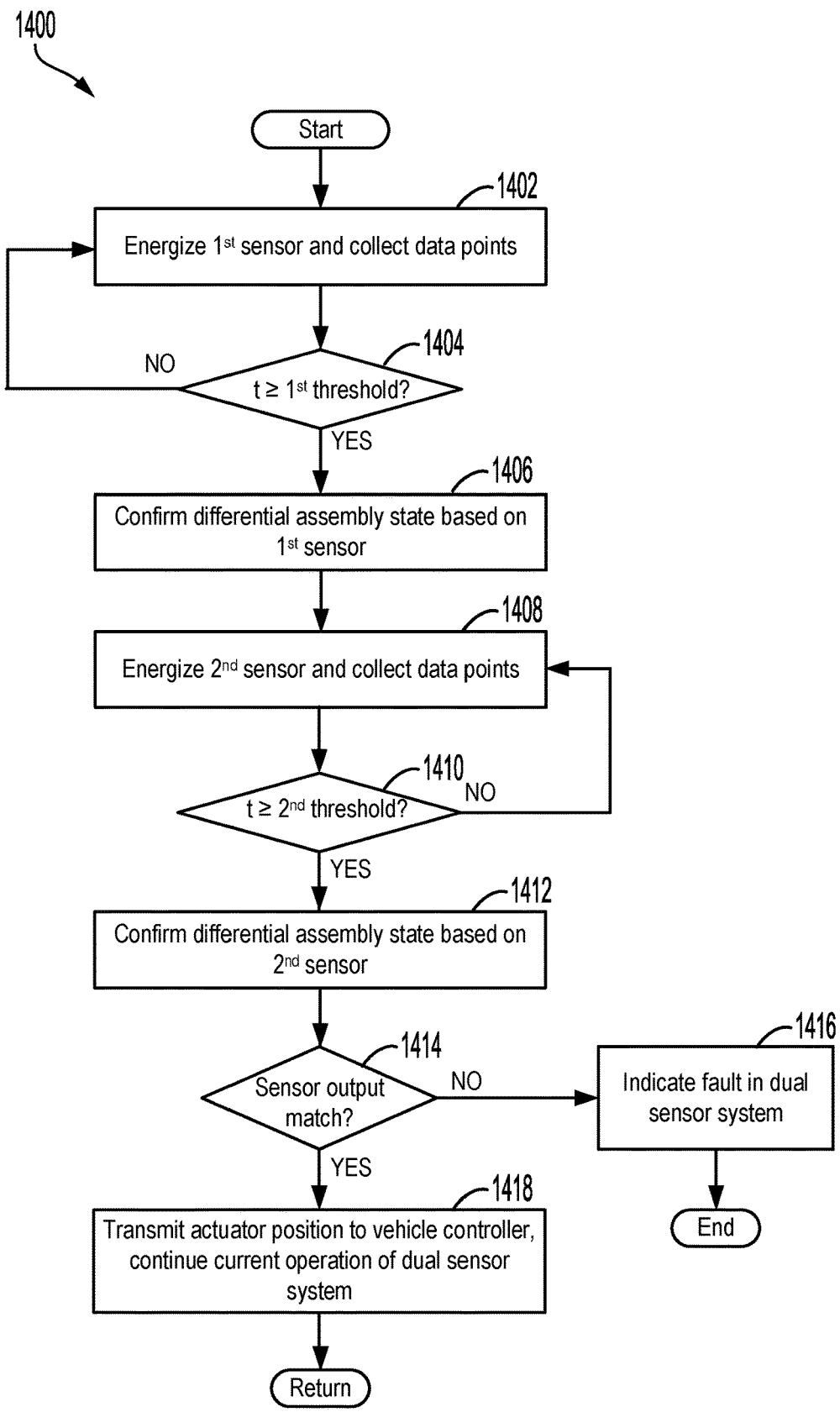
FIG. 14 shows a flowchart for a method of using a multi-sensor position sensing system with at least two eddy current sensors for a differential disconnect axle assembly.

A differential system with a circuit board assembly for a locking mechanism is shown in FIGS. 1-2 and the circuit board assembly is depicted in detail in FIG. 3. A first embodiment of a differential system, illustrating an exemplary configuration and use-case, is shown in FIG. 4. A second embodiment of a differential system is depicted in FIGS. 5-8, which may include a multi-sensor position sensing system. In one example, the multi-sensor position sensing system may include a multi-sensor sub-assembly to monitor a status of the differential system. The multi-sensor sub-assembly may rely on at least two separate sensors to confirm or identify a state or position of a differential locker of the differential system. In order to increase a robustness of the multi-sensor and reduce sensor packaging, in some examples, the sensors may be enclosed within a common housing and, in some examples, may share one or more components even though they may operate as two distinct sensors. Examples of multi-sensor configurations are illustrated in FIGS. 9-11 and an example of a multi-sensor sub-assembly is shown in FIG. 12. Example methods for operating the multi-sensor sub-assembly are shown in FIGS. 13-14.

FIG. 1 shows a differential system 100 (e.g., locking differential system). The differential system 100 may be included in a vehicle schematically depicted at 101. The vehicle 101 may be a light, medium, or heavy duty vehicle. Said vehicle, in one example, may be a vehicle utilizing an internal combustion engine as a motive power source. In another example, said vehicle may be an electric vehicle, such as a battery electric vehicle (BEV) or a hybrid electric vehicle. In the hybrid vehicle example, both the motor system and an internal combustion engine may be used to generate motive power, while in the BEV example the internal combustion engine may be omitted. The BEV may have a less complex powertrain configuration which may reduce a likelihood of powertrain degradation, in certain cases.

The differential system 100 includes an electromagnetic solenoid actuator 102 configured to induce locking and unlocking of a differential locking mechanism schematically depicted at 104. Arrows 105 indicate the locking and unlocking action between the actuator and the locking mechanism. The differential locking mechanism may include components such as a locking plate configured to engage and disengage speed differentiation between the differential's side gears. Although the differential locking mechanism is schematically illustrated, it will be understood that the locking mechanism has greater structural complexity, which is expanded upon herein with regard to FIG. 4. As described herein, when the differential is locked, speed differentiation between axle shafts is substantially inhibited and when the differential is unlocked, speed differentiation between the axle shafts is permitted.

A circuit board assembly 106 is further provided in the differential system 100. The circuit board assembly 106 includes control circuitry 108 and a multi-sensor sub-assembly 110 that includes two or more sensors. In one example, the control circuitry 108 may be positioned on an upper side 111 of the solenoid actuator 102. Positioning the control circuit on the upper side of the actuator enables the circuit to be spaced away from a lubricant sump. The sensors are configured to sense the position of a piston 112 in the solenoid actuator 102. Specifically, in one example, the multi-sensor sub-assembly 110 includes at least two eddy current sensors. In another example, the multi-sensor sub-assembly 110 includes at least one eddy sensor and at least one solenoid induction sensor. Thus, the multi-sensor sub-assembly 110 may send signals indicative of the piston's position to the control circuitry in the circuit board assembly 106. Any of the sensors may extend down a first face 114 of the solenoid actuator 102. In this way, the sensors may be arranged in a desired orientation to achieve targeted solenoid sensing functionality. To elaborate, the sensors may be arranged parallel to the plane of the solenoid actuator first face 114, allowing the sensors to discern between locked/unlocked positions of the differential system 100.

An eddy current sensor is an induction-based sensor with an antenna creating a high-frequency magnetic field. The eddy current sensor creates eddy currents in a paramagnetic sensing target which creates opposing magnetic fields. The opposing magnetic fields reduce the apparent inductance of the antenna that is then measured. The further the target is from the sensor, the less precise the measurement. The antenna can be tuned to measure the target closer or further away from the sensor.

A solenoid induction sensor measures the induction of an actuation solenoid to determine the position of the solenoid plunger. When the solenoid is powered, the solenoid plunger, which may be ferromagnetic, moves from the disconnected state to the connected state. The position of the plunger sets the inductance of the solenoid coil similar to an iron core in a transformer. The movement of the plunger from a disconnected to connected state correlates to a change in inductance, which may be measured indirectly by measuring the voltage across the coil and the current flowing through it.

While individual eddy current sensors and solenoid induction sensors each have limitations with regard to accurate and consistent measurement of solenoid positioning, the multi-sensor sub-assembly 110 implements multiple sensors to reduce impact of such limitations, thus resulting in a more robust measurement system. For example, an eddy current sensor may be more precise when a sensing plate of the eddy current sensor is closer to the sensor, representing the disconnected differential state, while a solenoid induction sensor is may more be precise when the solenoid is active, representing the connected differential state. Thus, by using a combination of either or both of these sensors, the multi-sensor sub-assembly 110 may provide a precise measurement at both the locked and unlocked differential states. In embodiments where the multi-sensor sub-assembly 110 includes two eddy current sensors, a second eddy current sensor may be tuned for a longer stroke than a first eddy current sensor, which may provide more accurate measurement at a greater distance. Further details of the multi-sensor sub-assembly 110 are provided below, with reference to FIGS. 9-14.

A multi-sensor system is suitable for a safety-sensitive system such as an axel disconnect, which drives power from a motor to the vehicle wheels. For example, should one of the sensors experience a fault, the other sensor may continue to determine the vehicle state and thus ensure that a vehicle condition suitable for operation is maintained.

The circuit board assembly 106 may be in electronic communication with a vehicle controller 116 (e.g., electronic control unit (ECU)) via wired and/or wireless communication. The vehicle controller 116 may therefore be spaced away from the circuit board assembly. The vehicle controller 116 may be configured to implement control strategies such as engine control, motor control, powertrain control, and the like. The vehicle controller 116 may combine data from each of the two or more sensors of the multi-sensor sub-assembly 110 to determine a single system state. The circuit board assembly 106 may send rapidly distinguishable messages, such as messages indicating locked or unlocked differential state, to the vehicle controller. In some examples, the circuit board assembly 106 may provide status updates including a circuit board state update and the state of the differential system to the vehicle controller. To accomplish the aforementioned vehicle control functionality, the vehicle controller may include a memory 118 storing instructions executable by a processor 120 to carry out the vehicle control strategies.

An axis system 150 is provided in FIG. 1 as well as FIGS. 2-4, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples. A central axis 152 of the differential system 100 is further provided in FIG. 1 and FIGS. 2 and 4, for reference. It will be understood that the central axis 152 may be the rotational axis of the axle shafts in the differential system. As described herein, axial movement may refer to a component's movement along a direction parallel to the central axis.

FIG. 2 shows an exploded view of the differential system 100. The electromagnetic solenoid actuator 102 and the circuit board assembly 106 are again depicted. As indicated above, the solenoid actuator 102 is designed to trigger differential locking and unlocking. To accomplish the locking-unlocking functionality, the electromagnetic solenoid actuator 102 includes a coil assembly 200 and the piston 112. The coil assembly 200 is electrically coupled to an energy source 202 (e.g., battery, capacitor, alternator, etc.). The coil assembly 200 may be energized to induce axial movement of the piston 112 to trigger locking and unlocking of the differential. The piston 112 may therefore function as an armature, in one example. In particular, the coil assembly 200 may be selectively energized and de-energized to induce activation and deactivation of the electromagnetic solenoid actuator 102. Activation and deactivation of the solenoid actuator causes differential locking and unlocking.

In one example, the electromagnetic solenoid actuator 102 may be activated via a multi-stage control strategy. Therefore, in some instances, the solenoid actuator may, in a first stage, be energized with a higher current to induce movement of the piston 112 and in a second stage, be energized via a lower current to hold the piston in a desired position. Thus, in one specific embodiment, the solenoid actuator may be activated via a peak and hold strategy where the current delivered to the solenoid is stepped down during activation. When the circuit board assembly 106 is incorporated into the differential and manufactured therewith, the precision in solenoid actuator control may be increased, thereby increasing actuator performance and vehicle handling performance, correspondingly. Incorporating the circuit board assembly 106 into the differential further enables the circuit board assembly 106 to be more precisely calibrated when manufactured, in certain cases. For instance, a sole manufacturer may assemble the differential and control circuitry and then subsequently calibrate the control circuitry. Consequently, the precision in solenoid actuator control may be further increased, which increases actuator performance.

The electromagnetic solenoid actuator 102 may further include a washer 204. The washer 204 may function to axially retain components in the actuator. The solenoid actuator 102 may further include a housing assembly 206. The housing assembly 206 may include a housing 208 and a plate 210. When assembled, the electromagnetic solenoid actuator 102 is fluidly sealed within the housing 208 and the plate 210. In this way, the solenoid may be shielded from lubricating fluid (e.g., oil) within the differential enclosure. The plate 210, in one example, includes a recess 211 profiled to mate with one or more sensor extensions (such as sensor extension 213) of a circuit board assembly housing 226, expanded upon herein. In this way, the circuit board assembly may be sealed with the solenoid actuator 102. The recess 211 may have a shape which correlates to the shape of any or all of the sensors of the multi-sensor sub-assembly 110. As such, in one example, the recess may have two opposing walls 227 which are parallel to one another and profiled to seal the sensors. However, other recess shapes have been contemplated.

The coil assembly 200 may include the first face 114 (e.g., inner axial face), a second face 212 (e.g., outer axial face) opposite the first face, and an outer circumferential surface 214 extending between the first and second faces. These solenoid components may enclose coil windings which when energized cause the piston 112 to move in an axial direction, e.g., the piston 112 is axially displaceable.

The control circuitry 108 is configured to implement control and diagnostic strategies. For instance, the control circuitry 108 may selectively energize the solenoid actuator to induce locking and unlocking of the differential based on one or more operating conditions. To accomplish the control and diagnostic functionality the control circuitry 108 may include memory executable by a processor. The memory may store instructions executable by the processor to carry out the control methods, strategies, etc. described herein. To elaborate, the processor may include a microprocessor unit and/or other types of circuits. The memory may include known data storage mediums such as random access memory, read only memory, keep alive memory, combinations thereof, etc. The circuit board assembly 106 may be included in a control system 216 which further includes one or more input devices such a button, graphical user interface (GUI), knob, switch, slider, and the like which enable a system operator to initiate differential locking and unlocking functionality. Additionally or alternatively, the circuit board assembly 106 may be configured to programmatically lock and unlock the differential based on operating conditions such as vehicle speed, vehicle traction, vehicle load, and the like.

The housing 208 may include a cut-out 218 which extends through a circumferential surface 220 and an outer wall 222. The cut-out 218 mates and seals the circuit board assembly 106. In this way, circuit board assembly 106 may be space efficiently incorporated into the solenoid actuator while fluidly sealing the actuator from lubrication fluid present in the differential. The cut-out 218 may specifically include opposing walls 224. The profile of the walls 224 may correspond to the profile of the circuit board assembly housing 226. Specifically, in one example, the walls 224 may be parallel to one another to enable the circuit board assembly to be efficiently sealed with the solenoid actuator. However, other wall profiles have been envisioned. The actuator housing 208 may further include an inner circumferential extension 228 (e.g., annular extension) designed to mate with a section of the differential such as a differential case.

The control circuitry 108 and the sensors may form an L-shape, in one example. To elaborate, the multi-sensor sub-assembly 110 may be arranged at a substantially perpendicular angle 230 to the control circuitry 108. Thus, as shown the circuit board assembly 106 may include a continuous base 232 that comprises an upper section 234 and a side section 236 that radially extends towards the central axis 152. In this way, the multi-sensor sub-assembly 110 may be arranged at a desired angle for sensing operation while allowing the control circuit to be spaced away from the solenoid coils which generate heat during operation.

The circuit board assembly 106 further includes the sealed circuit board assembly housing 226 with a first section 238 which may have an L-shape profile corresponding to the L-shape of the underlying circuit board. Other embodiments may include various different types of shape profiles and positioning of individual elements. A second section 240 (e.g., cover) may, when assembled, attach to the first section 238 to seal the circuit board therein. The second section 240 may include a planar face which increases heat transfer from the circuit to the surrounding environment while the housing achieves a space efficient profile. The second section 240 may mate in an opening 241 of the first section 238. The second section 240 further includes a planar top surface 243 which may be laterally aligned which allows the housing to transfer greater amounts of heat to the surrounding environment.

The circuit board assembly housing 226 may include a wiring interface 242 (e.g., wiring harness). In one embodiment, the wiring interface 242 may be a controller area network (CAN) wiring interface with four wire ports 244, as illustrated. However, in other embodiments, the wiring interface 242 may be a local interconnect network (LIN) wiring interface with three wire ports (one signal wire, one power wire, and one ground wire). When a CAN wiring interface is deployed, degradation of the circuit board's components may be more easily identified. On other hand, when an LIN wiring interface is deployed, the likelihood of wire degradation is decreased, due to a reduction in wires and packaging of the circuit board assembly may be simplified, in certain scenarios. The wire ports 244 may be arranged along an axis 246, shown in FIG. 3, parallel to the central axis 152. In this way, the circuit board assembly 106 may achieve a space efficient form which spaces the heat producing sections of the board away from the coil assembly 200 which generates heat during operation. Consequently, the chance of the circuit board assembly's temperature surpassing a desired value may be reduced.

The circuit board assembly 106 may further include wire seals 248 coupled to the wiring interface 242 to reduce a likelihood of lubricant interfering with the wiring and entering the circuit board enclosure. In this way, the assembly's longevity may be further increased.

FIG. 3 shows a detailed depiction of the control circuitry 108 and the multi-sensor sub-assembly 110 in the circuit board assembly 106, in one example. As depicted in the example, the continuous base 232 may be provided in the circuit board assembly. The continuous base 232 may include the upper section 234 with the control circuitry and the side section 236. Similar to the assembly's housing, the upper section 234 may be arranged at a substantially perpendicular angle 230 to the side section 236. The upper section 234 includes circuitry which may include memory and a processor designed to implement the control strategies, methods, and/or diagnostics described herein. The side section 236 includes the multi-sensor sub-assembly 110, which may include eddy current sensor circuitry configured to sense movement of the solenoid piston. The multi-sensor sub-assembly 110 may also include solenoid induction circuitry configured to sense movement of the solenoid piston. The board's wiring interface 242 is again shown with the wire seals 248 on the wire ports.

FIG. 4 shows a first use-case example of a differential system 400. The differential system 400 includes an electromagnetic solenoid actuator 402 and a circuit board assembly 404 which may share at least some of the structural and functional features with each of the electromagnetic solenoid actuator 102 and the circuit board assembly 106 shown in FIGS. 1-3.

The differential system 400 may include a gear 406 (e.g., ring gear) which may be coupled to a drivetrain gear (e.g., pinion gear). The gear 406 may be rotationally coupled to a prime mover (e.g., internal combustion engine, motor, combinations thereof, and the like) schematically depicted at 408. Arrows 410 indicate the flow of power between the prime mover and the gear 406.

The gear 406 is coupled to a shaft 412 on which gears 414 (e.g., pinion gears) reside. The gears 414 are coupled to side gears 416, 418. In turn, the side gears 416, 418 are coupled to axle shafts 420, 422 (a pair of axle shafts) which may be rotationally coupled to drive wheels 424 indicated via arrows 425. Splines 426 and/or other suitable attachment interfaces may facilitate attachment between the axle shafts and the side gears 416, 418. The differential system 400 may further include a case 428 coupled to the gear 406.

A locking gear 430 in a locking device 432 (e.g., a differential locker) of the differential system 400 may be actuated via the solenoid actuator 402, the locking device 432 having a differential effect. Thus, the locking gear 430 may be placed in an unlocked position and a locked position via the actuator. In the unlocked position, teeth 434 in the locking gear 430 are spaced away from teeth 436 in the side gear 416, in one example. Continuing with such an example, conversely, in the locked position, the teeth 434 in the locking gear 430 are mated with the teeth 436 in the side gear 416. In this way, the differential may be locked and unlocked via the locking device 432. However, other suitable types of locking mechanisms have been contemplated. The differential system may further comprise springs 431 arranged between the locking gear 430 and the side gear 416. The springs function to return the locking gear to an unlocked position. However, other locking device configurations have been contemplated.

The solenoid actuator 402 may be coupled to a body section 438. The circuit board assembly 404 again arranges a multi-sensor sub-assembly 440 down a face 442 of the solenoid actuator 402. In one example, the multi-sensor sub-assembly 440 may be similar to the multi-sensor sub-assembly 110 of FIGS. 1-3. Control circuitry 444 may again laterally extend across a top side 446 of the solenoid actuator 402. In this way, the circuit board assembly 404 may be spaced away from lubricant 448 (e.g., oil) which is stored in a lubricant reservoir 450 (e.g., sump) of an axle housing. Consequently, the likelihood of the lubricant interfering with circuit operation is reduced. A housing 452 of the solenoid actuator 402 is further depicted in FIG. 4. The housing 452 at least partially encloses a coil assembly 454 in the solenoid actuator. Specifically, the housing 452 seals the coil assembly 454 and the circuit board assembly 404 to the solenoid actuator.

Figure 5:
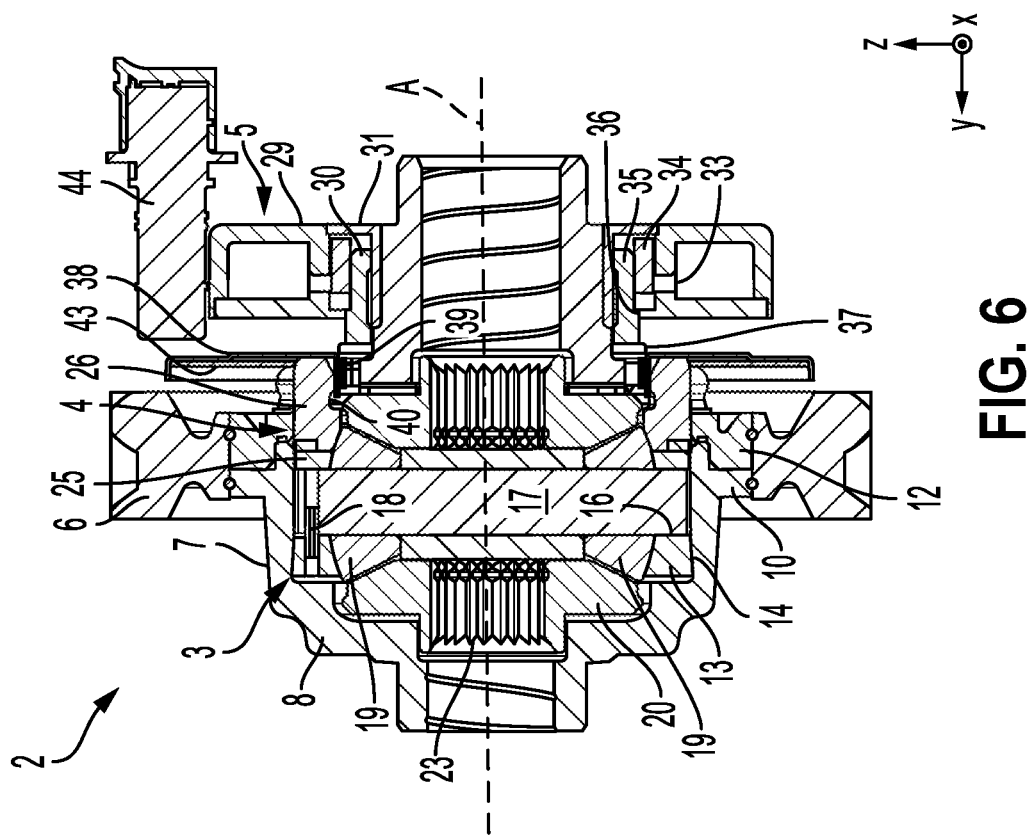
FIG. 5 is a longitudinal section of an inventive differential assembly with a coupling in a first embodiment in an open position of the coupling.
Figure 6:
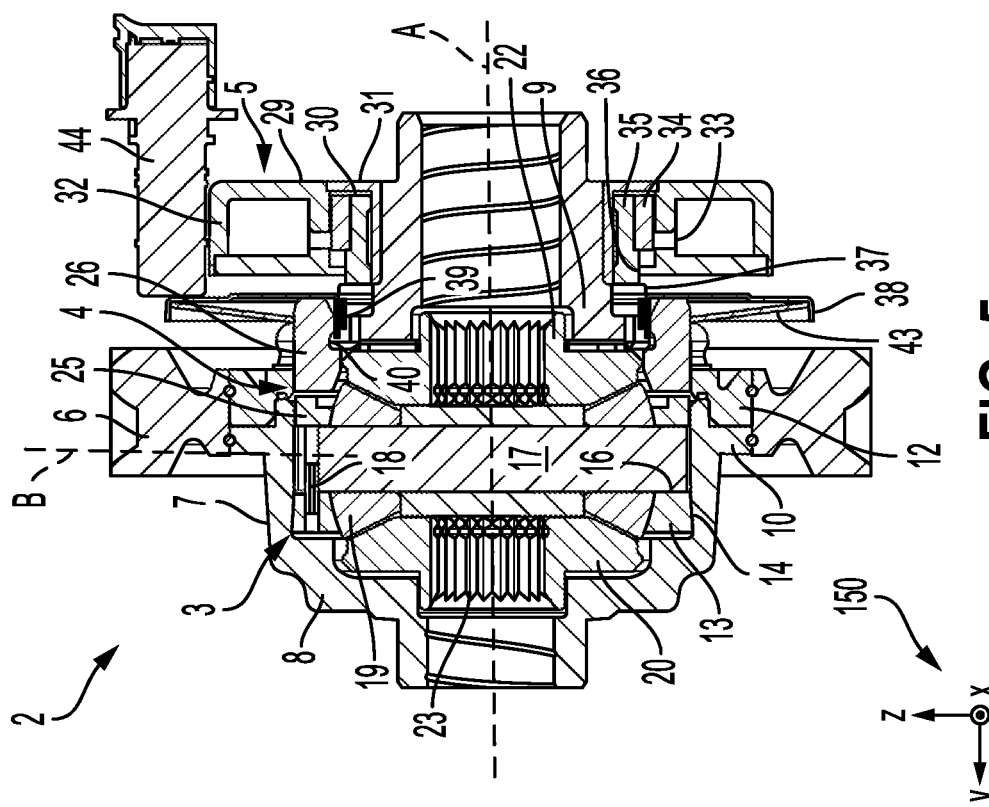
FIG. 6 shows the differential assembly according to FIG. 5 in a closed position of the coupling.
Figure 7:
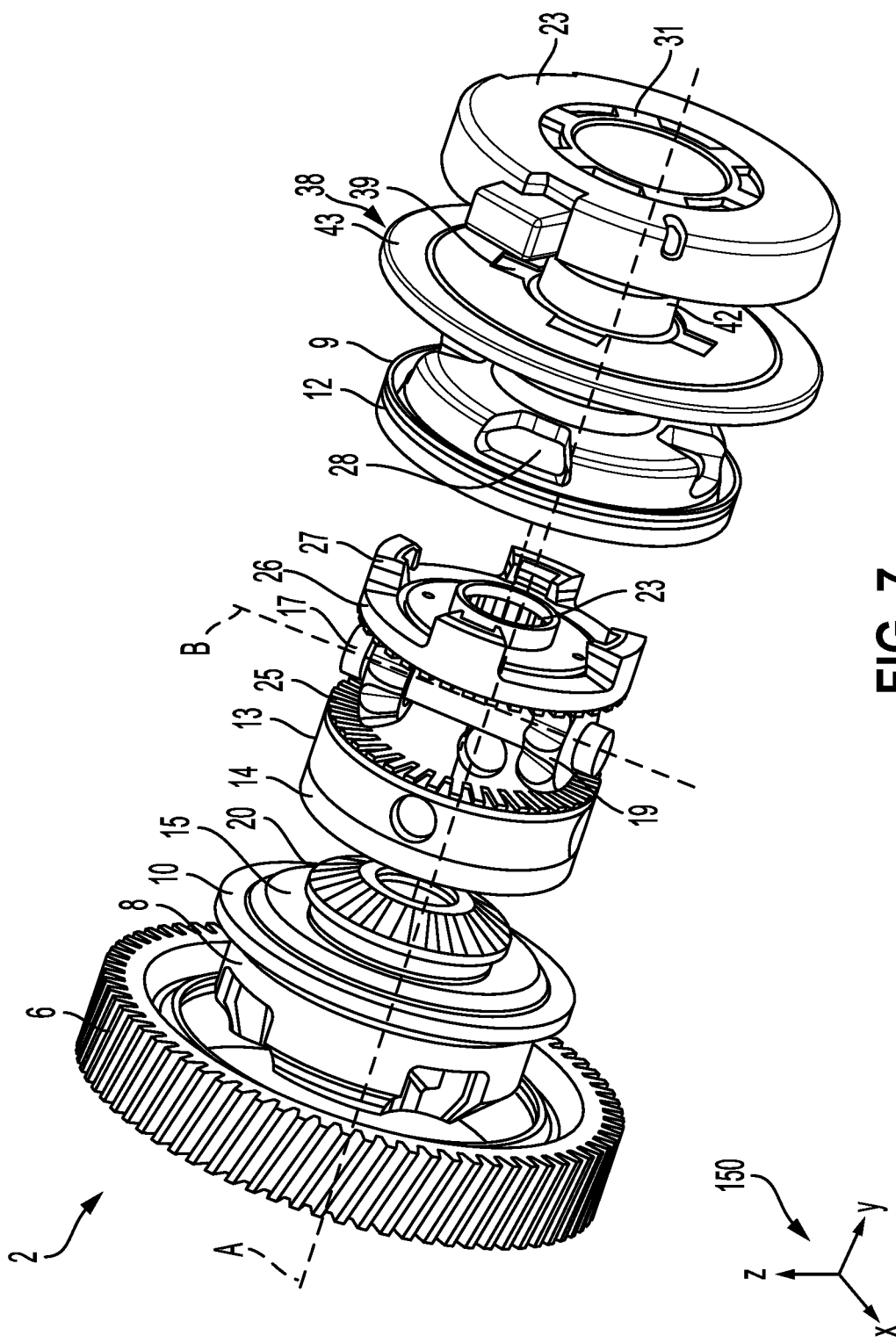
FIG. 7 is an exploded perspective view of the differential assembly according to FIG. 5.
Figure 8:
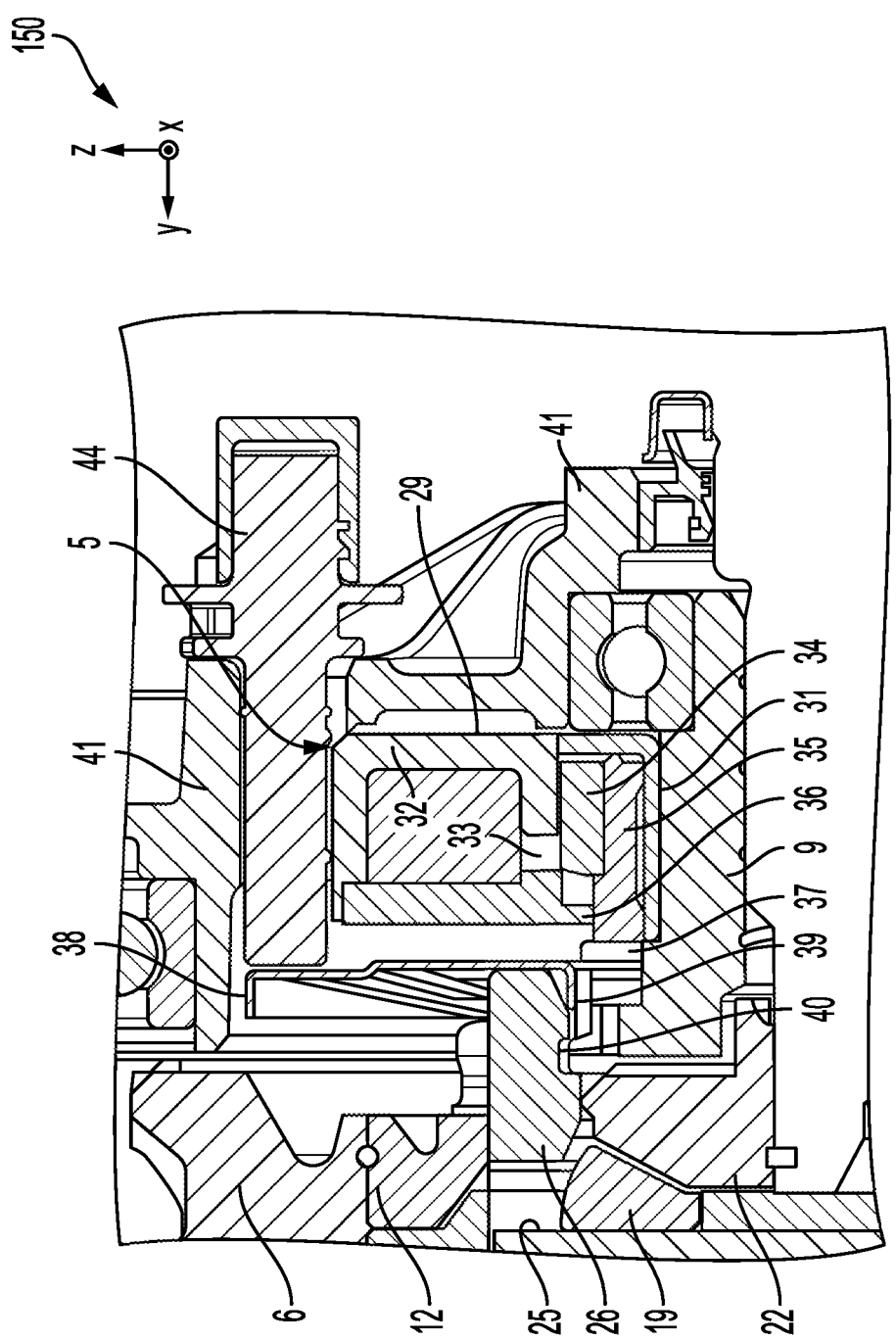
FIG. 8 is a longitudinal section of a detail of the differential assembly according to FIG. 5.

A second example of a differential assembly 2 is depicted in FIGS. 5-8, which may be used similarly to the differential system 400 of FIG. 4. Cut-away views of the differential assembly 2 are shown in FIGS. 5 and 6, illustrating the differential assembly in a first, disengaged position and a second, engaged position, respectively. A detailed view of region of the cut-away views of FIGS. 5 and 6 is depicted in FIG. 8. An exploded, perspective view of the differential assembly 2 is shown in FIG. 7.

The differential assembly 2 includes a differential drive 3, a coupling 4 and an actuator 5 for actuating the coupling 4, as illustrated in FIGS. 5-6. The actuator 5 represents an input part of the differential assembly 2 while the coupling 4 includes a two output parts of the differential assembly 2. For introducing a torque from a driving motor (not shown), there is provided a driving gear 6 which is firmly connected to the differential housing 7, more particularly by welding. It is understood, however, that the connection between the driving gear 6 and the differential housing 7 can also be effected in a different way, for example by a bolted connection or other conventional connecting arrangements. The differential housing 7 is constructed in two parts and comprises a first cup-shaped housing part 8 and a second cup-shaped housing part 9 which, in the region of their aperture ends, each comprise a flange portion 10, 12 by which they are connected to the driving gear 6. The first housing part 8 contains the differential drive 3 which is rotatingly drivable around an axis of rotation A.

The differential drive 3 includes a differential carrier 13 with a substantially cylindrical outer face 14. The differential carrier 13 is slidingly supported by the outer face 14, relative to the respective inner cylindrical face portion 15 of the first housing part 8 so as to be rotatable around the axis of rotation A. In the differential carrier 13 there are provided two bores 16 into which a journal 17 is inserted and fixed by a securing pin 18. As shown with greater clarity in FIG. 7, two differential gears 19 are supported on the journal 17 so as to be rotatable around a journal axis B. The two differential gears 19 engage teeth of a first sideshaft gear 20 and of a second sideshaft gear 22, (the second sideshaft gear 22 shown in FIGS. 5 and 6 but not 7) which are arranged coaxially relative to the axis of rotation A. The two sideshaft gears 20, 22 each include longitudinal teeth 23, respectively splines, which can be inserted into corresponding counter teeth of a sideshaft (not shown). The first sideshaft gear 20 is axially supported relative to the first housing part 8, and in one exemplary arrangement, a sliding disc is arranged between the first sideshaft gear 20 and the supporting face of the first housing part 8. Accordingly, for supporting the axial forces, a sliding disc is also arranged between the second sideshaft gear 22 and the second housing part 9.

In the example, the coupling 4 is provided in the form of a form-locking coupling, more particularly a toothed coupling or dog clutch and has a differential effect. It is understood that other types of couplings can also be used, for instance a friction coupling. The form-locking coupling 4 includes a first coupling part 25 which is firmly connected to the differential carrier 13, as well as a second coupling part 26 which is axially movable relative to the first coupling part 25. For torque transmitting purposes, the second coupling part 26 can be engaged with the first coupling part 25, and there is then achieved a form-locking connection between the two coupling parts 25, 26. By once again disengaging the second coupling part 26, the transmission of torque can be interrupted.

The first coupling part 25 includes a toothed ring as the form-locking element which is integrally formed on to the end face of the differential carrier 13, as shown in FIG. 7. Accordingly, the second coupling part 26 comprises a corresponding toothed ring which is arranged inside the differential housing 7. Furthermore, the second coupling part 26 includes a plurality of circumferentially distributed axial projections 27 which pass through corresponding passages 28 of the differential housing 7. By suitably controlling the actuator 5, the second coupling part 26 can be axially moved relative to the first coupling part 25, whereby a transmission of torque is ensured from the driving gear 6 to the differential drive 3 in an engaged condition, whereas the transmission of torque is interrupted in a disengaged condition. When the coupling 4 is engaged, the coupling may be in a closed position and when the coupling 4 is disengaged, the coupling may be in an open position. Together, the coupling 4 and the actuator 5 may form a differential locker.

The actuator 5 includes an electromagnet 29 and a piston 30, as shown in greater detail in FIG. 8. The actuator 5 is designed in such a way that, when supplying the electromagnet 29 with current, the piston 30 is loaded towards the coupling 4. For this purpose, the electromagnet 29 includes an annular housing 32 which comprises an aperture 33 at a radially inner end facing the coupling 4. The piston 30 is arranged so as to be axially movable, e.g., axially displaceable inside said housing portion. The housing 32 is arranged on a sleeve portion of the second housing part 9 by means of a carrier element 31. The piston 30 comprises an anchor element 34 that may be made of a ferromagnetic material, for instance an iron material, as well as a sleeve 35 formed of a paramagnetic material or a non-magnetic material, for example stainless steel, copper or aluminum. The anchor element 34 is sleeve-shaped and pressed on to the sleeve 35.

Because the anchor element 34 is produced from a ferromagnetic material, it is moved towards the coupling 4 when the electromagnet 29 is operated, with the aperture 33 being bridged. In its end position, the anchor element 34 abuts a shoulder 36 of the magnet housing 32 and there occurs a friction contact. The sleeve 35 is paramagnetic or non-magnetic, in order to prevent undesirable magnet flow leakage to other components.

The sleeve 35 is axially longer than the anchor element 34 and includes an end face which is in contact with a sliding mechanism 37. The sliding mechanism 37 may be in the form of a sliding bush, which can also be referred to as a sliding ring. The sliding mechanism 37 is made of a low-friction material, such as bronze, sinter metal or any other suitable low friction material. Thus, the sliding mechanism 37 is suitable to decouple the rotational movement of the rotating second coupling part 26 relative to the stationary piston 30. The sliding mechanism 37 is indirectly axially supported relative to the second coupling part 26 via a transmitter element 38. In another example, the sliding mechanism may be an anti-friction coating which is provided on at least one of parts which is rotating relative to another part, where the rotating part may be, for example, one part out of the group sleeve 35, any intermediate part between the sleeve 35 and the second coupling part 26, such as the transmitter element 38, and the second coupling part 26. The sliding mechanism 37 can also be formed integral with the sleeve 35, so as to form an integral sliding sleeve made of a low friction material. The sliding mechanism 37 can also be formed integral with the transmitter element 38, so as to form an integral sliding transmitter element made of a low friction material.

In one example, the transmitter element 38 is provided in the form of an annular disc which, on its radial inside, includes a plurality of circumferentially distributed, axially extending resilient engagement elements 39 which, by means of their ends, form-lockingly engage one or several undercuts 40 of the second coupling part 26. At its radially outer end, the annular disc comprises a cylindrical portion 42, as shown in FIG. 7. Between the differential housing 7, respectively the second housing part 9, and the transmitter element 38, there is arranged a returning spring 43. In the present embodiment, the returning spring 43 is provided in the form of a plate spring, and it is understood that it is also possible to use other types of spring, such as helical springs.

Furthermore, a multi-sensor sub-assembly 44 having multiple sensor units is provided which may be arranged axially in the region of the actuator 5 and which cooperates with the transmitter element 38. Each of the sensors of the multi-sensor sub-assembly 44 may be able to record the distance from the transmitter element 38 in a contact-free way, e.g., as an eddy current sensor, or a solenoid induction sensor. The sensor units may be positioned together or separate from each other. In the example, the multi-sensor sub-assembly 44 is received in a stationary housing 41 partially shown in FIG. 8 and arranged such that a main direction of extension of the multi-sensor sub-assembly 44 extends parallel to the axis of rotation A of the differential drive 3. In the open position of the coupling 4, i.e. in the position in which the transmitter element 38 axially approaches the multi-sensor sub-assembly 44, there is provided a gap between the transmitter element 38 and the multi-sensor sub-assembly 44. This position, e.g., the first, disengaged position, in which the multi-sensor sub-assembly 44 is open is shown in FIG. 5, where the differential locker is disengaged or unlocked. FIG. 6, on the other hand, shows a switched position in which, for the purpose of transmitting torque from the driving gear 6 to the differential carrier 13, the coupling 4 is in the second, engaged position, e.g., the differential locker is engaged or locked. It can be seen that the transmitter element 38 together with the second coupling part 26 has been moved relative to the multi-sensor sub-assembly 44 towards the first coupling part 25 and the differential drive 3, respectively.

As described above, a multi-sensor sub-assembly, such as the multi-sensor sub-assembly 110 of FIGS. 1-3, 440 of FIG. 4, and 44 of FIGS. 5-8, may be used to confirm a position of a solenoid actuator of a differential system. By incorporating two or more sensors into the multi-sensor sub-assembly, the position of the solenoid actuator may be detected with greater accuracy. Furthermore, if one of the sensors becomes degraded, the other of the sensors may still be used to estimate the position of the solenoid actuator, thereby increasing a robustness of the multi-sensor sub-assembly.

In one example, the multi-sensor sub-assembly may be a multi-sensor system having two eddy current sensors, each of the eddy current sensors coupled to a common microcontroller. An arrangement of the eddy current sensors may vary depending on desired attributes of the multi-sensor sub-assembly. For example, the arrangement may be selected according to one or more of a demand for low cost and a small footprint or an ability to continue operating in instances where one of the eddy current sensors becomes degraded. Examples of the multi-sensor system configurations are described below with reference to FIGS. 9-11.

Turning first to FIG. 12, an example multi-sensor sub-assembly 1200, which may be an example of the multi-sensor sub-assembly 110 of FIGS. 1-3, 440 of FIG. 4, and 44 of FIGS. 5-8, is shown. An axis system 1220 is provided for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

The multi-sensor sub-assembly 1200 may be an example of a multi-sensor system with two eddy current sensors, as further described below in FIGS. 9-11. Each of the eddy current sensors includes an inductive coil 1202, which creates a high-frequency magnetic field. In one example, a first inductive coil of a first eddy current sensor may be configured as a set of coils with a first coil stacked on top of a second coil, e.g., along the z-axis. A second inductive coil of a second eddy current sensor may be configured as a third coil positioned above and spaced away from a fourth coil, where the first and the second coils of the first inductive coil may be inserted therein. In other words, the first inductive coil may be sandwiched between the third coil and the fourth coil of the second inductive coil, with all the coils stacked along the z-axis.

In another example, not shown in FIG. 12, both the first and the second inductive coils include two coils stacked along the z-axis. In this example, the first and the second inductive coils may be positioned adjacently in the same plane, e.g., along the x-y plane. The first and second inductive coils may or may not have a distance therebetween separating the first and the second inductive coils. Further details regarding operation of the first and the second eddy current sensors will be described in FIGS. 9-11.

In one example, further described in FIG. 9, each eddy current sensor of the two eddy current sensors may include an oscillator that, when supplied with voltage, may generate an alternating, primary magnetic field. In another example, further described in FIGS. 10-11, the two eddy current sensors may share a single oscillator. The multi-sensor sub-assembly 1200 may therefore include at least one oscillator 1204. The multi-sensor sub-assembly 1200 may further include at least one switch, for example, a switch 1206, which may be opened and closed to allow selective use of either or both of the two inductive coils, as further described in FIGS. 9-11. A microcontroller 1208 may be electrically coupled to other components such as a temperature sensor 1210, a reference clock 1212, the one or more oscillators 1204, a current switch 1214, and other components, as further described in FIGS. 9-11.

Turning now to FIG. 9, a first example of a multi-sensor system 900 is shown. The multi-sensor system 900 may be an example configuration of elements of a multi-sensor sub-assembly, such as the multi-sensor sub-assembly 1200 of FIG. 12. The multi-sensor system 900 includes an electronic control unit (ECU) 902 electronically coupled to a sensor body 904 of the multi-sensor system 900. The ECU 902 may supply a set voltage, such as between 5.5V-7.5V, to components of the sensor body 904, to activate operation of the components. For example, the voltage input by the ECU 902 may be used by a temperature sensor 906, a reference clock 908, a first eddy current sensor 910, and a second eddy current sensor 912. Each of the first eddy current sensor 910 and the second eddy current sensor 912 may be electrically coupled to a microcontroller 914 to deliver a current output to the microcontroller 914. The temperature sensor 906 may be configured to measure a temperature at the microcontroller 914 to confirm that the microcontroller 914 is operating within an optimal temperature range, such as between −40° C. to 155° C. The reference clock 908 may provide a reference time basis for comparing a measured frequency of a resonant coil e.g., an inductive coil, of the multi-sensor system 900 where the measured frequency is proportional to a distance between the resonant coil and an electrically conductive target. The electrically conductive target may be, for example, the transmitter element 38 of FIGS. 5-6 and 8. An accuracy of the reference time basis directly affects an accuracy of the measured frequency and therefore an accuracy of an estimate of the distance between the resonant coil and the target.

The first and the second eddy current sensors 910, 912 each include an oscillator (e.g., a LC oscillating circuit with a capacitor) and an inductive coil which resonates at a frequency proportional to an inductance of the inductive coil. The oscillator, when supplied with the voltage from the ECU 902, may generate an alternating, primary magnetic field at the inductive coil. As such, the inductive coil of the oscillator may also be an excitation coil of the eddy current sensors. In one example, a first oscillator 916 of the first eddy current sensor 910 may operate at a different frequency than a second oscillator 917 of the second eddy current sensor 912. For example, the first oscillator 916 may operate at 8 MHz while the second oscillator 917 may operate at 5 MHz. By configuring the eddy current sensors with different operating frequencies, the first and the second eddy current sensors 910, 912 may have different penetrating depths for inducing eddy currents at the electrically conductive target. The different penetrating depths may allow accurate differentiation between an unlocked and locked position of a differential assembly.

The inductive coil of each oscillator may include two stacked coils, as described above with reference to FIG. 1200, where the two stacked coils are stacked without any other components therebetween, or are spaced apart with, for example, another inductive coil placed therebetween. In one example, the first eddy current sensor 910 includes a first inductive coil 918 and the second eddy current sensor 912 includes a second inductive coil 919. The first inductive coil 918 may be positioned between two coils of the second inductive coil 918 or, alternatively, the second inductive coil 918 may be positioned between two coils of the first inductive coil 918. Alternatively, the first and the second inductive coils 918, 919 of the first and the second eddy current sensors 910, 912, respectively, may be positioned adjacently in a same plane.

When the electrically conductive target is positioned within the primary magnetic field of the inductive coil, eddy currents may be generated at a surface of the target, generating a secondary magnetic field. The secondary magnetic field may induce a change in the primary magnetic field of the inductive coil arising from opposition of the secondary magnetic field to the primary magnetic field. The change in inductance at the inductive coil may be measured and used to estimate a distance between the target and the inductive coil. In one example, the first eddy current sensor 910 may be optimized for a first operating range, e.g., a distance between the first inductive coil 918 and the target, and the second eddy current sensor 912 may be optimized for a second operating range, e.g., a distance between the second inductive coil 919 and the target. The second operating range may be a greater distance than the first operating range, for example. However, in other examples, the opposite may be true.

For example, when the target is within the first operating range of the first inductive coil 918, such as 1 mm, a proportional change in inductance may be detected at the first eddy current sensor 910 and may correlate to a distance between the inductive coil 918 and the target. The change may be reflected in a current signal delivered to the ECU 902 via the microcontroller 914 and a high/low current switch 920.

A magnitude of the current signal from the first inductive coil 918 may be similarly proportional and indicative of the distance between the first inductive coil 918 and the target. Depending on an amount of current received at the microcontroller 914, the microcontroller 914 may actuate the high/low current switch 920 according to the current signal magnitude to transmit the current signal to the ECU 902 based on the received amount of current. The current switch 920 may alternate between relaying a pre-determined low current and a pre-determined high current, where the low current may be indicative of the inductive coil being spaced further away from the target than the high current. In one example, the low current may be a current signal range between 5.0 mA and 6.9 mA and the high current may be a current signal range between 12.0 mA and 17.0 mA. The respective current signal ranges may be predetermined boundaries of the low and high currents. Thus, when the first eddy current sensor 910 transmits the low current, the differential assembly may be unlocked and when the first eddy current sensor 910 transmits the high current, the differential assembly is not unlocked. When the differential assembly is not unlocked, it may be transitioning to or from being locked or may be locked. As such, when the first eddy current sensor 910 transmits the high current, the differential assembly is in a transition state. When the current signal is at a level between the low current and the high current, the differential assembly may be deemed to be in an unknown state and the current switch 920 may not be actuated.

A similar application may be implemented at the second eddy current sensor 912. However, the second eddy current sensor 912 may be tuned for the second operating range, as described above, which may be a greater distance from the target than the first operating range of the first eddy current sensor 910. For example, the second operating range may be 3 mm. When the target is in the second operating range of the second inductive coil 919, the low current (e.g., between 5.0 mA-6.9 mA) may be transmitted by the second eddy current sensor 912, indicating that the differential assembly is locked and the high current (e.g., between 12.0 mA-17.0 mA) may be transmitted by the second eddy current sensor 912 to indicate that the target is beyond the second operating range of the second eddy current sensor 912. When the high current is transmitted, the differential assembly is not in the locked state and may therefore be transitioning to or from the unlocked state or may be unlocked. Detection of the differential assembly in the unlocked state, by first eddy current sensor 910 may be therefore confirmed by the second eddy current sensor 912 and detection of the differential assembly in the locked state by the second eddy current sensor 912 may be confirmed by the first eddy current sensor 910. Furthermore, when the current signal is between the low current and the high current values, the differential assembly is in the unknown state. A full system state of the differential assembly may thereby be known by combining outputs of both the first and the second eddy current sensors 910, 912.

In the example of FIG. 9, one of the first or second inductive coils 918, 919 and therefore two of the four receiving coils may be active at a time. For example, when the first inductive coil 918 of the first eddy current sensor 910 is positioned between the two coils of the second inductive coil 919, the first eddy current sensor 910 may be active and driving, while the second eddy current sensor 912 may be deactivated. Alternatively, the second eddy current sensor 912 may be activated while the first eddy current sensor 910 may be deactivated. The microcontroller 914 may deliver a voltage, for example, 5.5 V, for a predetermined period such that the second eddy current sensor 912 is actively probing the second magnetic field with the first eddy current sensor 910 inactive, concurrently. The predetermined period may be monitored by the reference clock 908 such that when the predetermined period elapses, the microcontroller delivers a different voltage output thereby activating the first eddy current sensor 910 and deactivating the second eddy current sensor 912. The microcontroller may therefore alternate between driving the first eddy current sensor 910 (via the first oscillator 916) and the second eddy current sensor 912 (via the second oscillator 917) to confirm the status of the differential assembly.

As described above, one of the first or the second eddy current sensors 910, 912, may be tuned for a longer stroke than the other eddy current sensor, such that a more accurate measurement of differential position may be given at a farther distance. However, the eddy current sensor tuned for the longer stroke may be less precise at a close distance than the eddy current sensor tuned for a shorter stroke. The eddy current sensor turned to the shorter stroke may compensate by providing more accurate measurements at a closer distance to the target.

By incorporating two eddy current sensors, each with an oscillator including an inductive coil, that are optimized for different operating ranges, a position of a differential locker may be determined with greater accuracy. The eddy current sensor tuned to a shorter stroke may be a short range sensor and the other eddy current sensor tuned to a longer stroke may be a long range sensor. In one example, the sensors may provide redundancy in confirming the differential locker position. For example, when the differential locker is disconnected, the differential locker position may be confirmed with high accuracy by the short range sensor and further confirmed by a corresponding indication provided by the long range sensor. When the differential locker is connected, the long range sensor may generate a more reliable measurement that is reinforced by the output of the short range sensor. The different ranges may also enhance an accuracy of diagnosing when the differential locker is in the unknown state, which may arise when the differential locker is stuck in a position between locked and unlocked, or when degradation of an actuator, such as the solenoid actuator 5 of FIGS. 5-8, occurs, which may lead to indication of an error state.

Additionally, the redundancy of the multi-sensors may be advantageous when one of the eddy current sensors becomes degraded and no longer able to detect the differential locker position. Regardless of the position of the differential locker, the non-degraded eddy current sensor may continue monitoring the status of the differential locker, thereby mitigating loss of use of the differential assembly.

In some examples, it may be desirable to minimize a number of components of the multi-sensor system to reduce a size, complexity, and cost of the multi-sensor system. For example, the above effects may be achieved by configuring the eddy current sensors to share at least one component, such as the oscillator, e.g., the oscillator capacitor and other components other than the inductive coils. As such, the inductive coils of each of the eddy current sensors may detect magnetic field changes caused by interference from a common target based on a common excitation magnetic field. The individual inductive coils, however, may be set to monitor and relay different frequencies, as described above.

Turning now to FIG. 10, a second example of a multi-sensor system 1000 is shown. The multi-sensor system 1000 may be configured with similar elements as the multi-sensor system 900 of FIG. 9, which will be similarly labeled in FIG. 10 and not reintroduced, for brevity. For example, the microcontroller 914, the current switch 920, the sensor body 904, the temperature sensor 906, the reference clock 908, and the ECU 902 of FIG. 9 are included in the multi-sensor system 1000 of FIG. 10.

The multi-sensor system 1000 is configured with a single oscillator 1016 which is selectively coupled to each of a first eddy current sensor 1010 and a second eddy current sensor 1012. In other words, the oscillator 1016 is shared between the first eddy current sensor 1010 and the second eddy current sensor 1012. The oscillator 1016 may be coupled to the microcontroller 914 in conjunction with the first eddy current sensor 1010 when a first switch 1022 is closed, and the oscillator 1016 may be coupled to the microcontroller 914 in conjunction with the second eddy current sensor 1012 when a second switch 1024 is closed. The microcontroller 914 may alternate between closing the first and the second switches 1022, 1024 such that the switches are not simultaneously open or simultaneously closed.

Similar to the first example of the multi-sensor system 900, one set of coils, either a first inductive coil 1018 of the first eddy current sensor 1010 or a second inductive coil 1019 of the second eddy current sensor 1012 may be driven at a time. When the first eddy current sensor 1010 is activated, the first switch 1022 may be closed, forming a path for current flow from the first inductive coil 1018 to the microcontroller 914 through the oscillator 1016. Alternatively, when the second eddy current sensor 1012 is driven, the second switch 1024 may be closed, forming a path for current flow from the second inductive coil 1019 to the microcontroller 914 via the oscillator 1016. As such, electrical coupling of the eddy current sensors to the microcontroller 914 is alternated, e.g., toggled, by adjusting positions of the first switch 1022 and the second switch 1024.

The oscillator 1016 may be configured to generate frequencies that each of the first inductive coil 1018 and the second inductive coil 1019 are tuned to. In other words, each of the inductive coils may be tuned to a different resonant frequency and the oscillator 1016 may generate a frequency corresponding to which of the inductive coils it is connected to. Each of the inductive coils may achieve their resonant frequency by interaction with the oscillator 1016. In other examples, however, the oscillator 1016 may be configured with a filter, such as, for example, a notch filter, to filter voltage input from the ECU 902 to a frequency corresponding to the first eddy current sensor 1010 or the second eddy current sensor 1012. In the example of FIG. 10, the first eddy current sensor resonant frequency may be 8 MHz and the second eddy current sensor resonant frequency may be 5 MHz.

The multi-sensor system 1000 may operate similarly to the multi-sensor system 900 of FIG. 9. For example, one of the eddy current sensors may be a short range sensor and the other may be a long range sensor, each configured to provide more accurate measurements at its optimal operating range. The multi-sensor system 1000 may therefore also provide redundant information regarding the differential assembly status, allowing one of the eddy current sensors to assume full responsibility for monitoring the differential locker position when the other sensor becomes degraded. Continuous use of the differential assembly is therefore maintained.

By using a single oscillator to drive two sets of inductive coils, a number of components and a footprint of the multi-sensor system may be reduced. However, a reliance of both eddy current sensors on the common oscillator may result in both sensors becoming non-operational if the oscillator is degraded. Thus, selection of the multi-sensor system configuration may depend on a preference for low cost/small size or robustness of the system.

Turning now to FIG. 11, a third example of a multi-sensor system 1100 is shown. The multi-sensor system 1100 may be configured with similar elements as the multi-sensor system 900 of FIG. 9 and the multi-sensor system 1000 of FIG. 10, which are similarly labeled in the multi-sensor system 1100 of FIG. 11 and will not be reintroduced. Similar to the multi-sensor system 1000 of FIG. 10, the multi-sensor system 1100 of FIG. 11 is configured with a single oscillator 1116 shared between a first eddy current sensor 1110 and a second eddy current sensor 1112. However, in the multi-sensor system of FIG. 11, a first inductive coil 1118 of the first eddy current sensor 1110 is constantly coupled to the oscillator 1116, e.g., constantly driven, while a second inductive coil 1119 of the second eddy current sensor 1112 is selectively coupled to the oscillator 1116 based on a position of a switch 1124 positioned between the oscillator 1116 and the second inductive coil 1119.

In one example, the first eddy current sensor 1110 may be a primary sensor for the multi-sensor system 1100 which may rely on measurements from the first eddy current sensor 1110 or a combination of the first eddy current sensor 1110 and the second eddy current sensor 1112 to determine if the differential assembly is in a locked or unlocked state. As such, the differential assembly state is confirmed when the first eddy current sensor 1110 provides a low current signal (e.g., between 5.0 mA-6.9 mA), indicating the differential locker is connected/locked, or a high current signal (e.g., between 12.0 mA-17.0 mA), indicating the differential locker is in the transition state. When the first eddy current sensor 1110 provides a current signal that is not the low or high current signal, the differential assembly is in an unknown state which may occur due to a fault in the system, e.g., a fault condition of the differential assembly.

In order to confirm if the differential assembly is disconnected/unlocked, the switch 1124 may be closed to connect the second inductive coil 1119 of the second eddy current sensor 1112. The second inductive coil 1119 is connected, inductances of the each of the first inductive coil 1118 and the second inductive coil 1119 may be summed. For example, a resonant frequency of the first inductive coil 1118 may be 5 MHz and a resonant frequency of the second inductive coil 1119 may be 3 MHz. When the switch 1124 is closed, a cumulative frequency of the second eddy current sensor 1112 may be 8 MHz. As described above, the differential assembly status between the disconnected/unlocked state and the transition state may be determined based on the current signal generated by the second eddy current sensor 1112. In this way, the multi-sensor system 1100 of FIG. 11 may operate similarly to the multi-sensor system 1000 of FIG. 10 with only one switch.

In the unknown state, the current signal may be deemed indicative of an error in operation of the differential assembly for any of the multi-sensor systems of FIGS. 9-11. The error may arise from a mechanical issue at the differential locker, e.g., an actuating system of the differential locker is degraded, the differential locker is stuck, etc., or the first eddy current sensor may be degraded. When the current signal falls outside of the boundaries of the low and high current signals, an alert or notification of a system fault may be provided to an operator.

The multi-sensor system (e.g., any of the systems of FIGS. 9-11) may be configured with various target parameters. For example, the eddy current sensors may be configured with an accuracy of +/−0.3 mm at a setpoint, a bandwidth of 125 Hz, an input voltage of 5.5 V-7.5 V (with a nominal input voltage of 7.0 V), a temperature rating of −40° C. to 155° C., field diagnostics with a customized debug interface, and a response time of 100 ms after a change in physical state. The transition state may be a positioning of the differential locker between the disconnected/unlocked and the connected/locked states during adjustment of the differential locker between the states. For example, gear teeth of a gear of the differential assembly may not immediately be positioned to mesh with gear teeth of a gear coupled to an axle of a vehicle. Rotation of the axle by a few degrees may be demanded before the teeth may fully mesh and engage during which the differential assembly may be in the transition state.

FIG. 13 shows a flowchart 1300 for a high-level method for operating a multi-sensor position sensing system for a differential disconnect axle assembly. The multi-sensor position sensing system may allow three possible states of the differential disconnect axle assembly to be identified, e.g., engaged, disengaged, and transitioning. The multi-sensor position sensing system may be used in the differential assemblies of FIGS. 4-8 and may include a multi-sensor sub-assembly, such as the multi-sensor sub-assembly 110 of FIGS. 1-3, the multi-sensor sub-assembly 440 of FIG. 4, the multi-sensor sub-assembly 44 of FIGS. 5-8, and the multi-sensor sub-assembly 1200 of FIG. 12. The multi-sensor sub-assembly may include at least a first sensor unit and a second sensor unit which may both be eddy current sensors, or one sensor may be a solenoid induction sensor and the other sensor may be an eddy current sensor. Operation of the sensor units may be controlled by a microcontroller configured with executable instructions.

At 1302, the first sensor unit senses a position of a piston of the differential assembly and transmits a first set of data regarding the piston position to an ECU. At 1304, which may be executed concurrently with 1302, the second sensor unit senses the position of the piston and transmits a second set of data regarding the piston position to the ECU. Either or both of the sensor units may be positioned in close proximity to or separate from the ECU. Certain embodiments may include more than two sensor units.

At 1306, the ECU combines the first set of data and the second set of data to determine a single system state. At 1308, a determination is made as to whether the first sensor unit has experienced a fault. Responsive to a determination that the first sensor unit has experienced a fault, the ECU continues to use the second set of data to determine the single system state, as indicated at 1312. Similarly, responsive to a determination that the second sensor unit has experienced a fault, the ECU continues to use the first set of data to determine the single system state, as indicated at 1314. If it is determined at 1308 or 1310 that the first or second sensors respectively have not experienced a fault, the method returns to 1306. In instances where both the first sensor unit and the second sensor unit are each determined to be faulted, operation of the differential assembly may be suspended and an alert and/or notification may be activated to indicate a status of the multi-sensor sub-assembly to a user. As a result of the operation of the multi-sensor position sensing system for the differential disconnect axle assembly described above, a more robust identification of the differential assembly status is enabled while circumventing use of the differential assembly status when the multi-sensor position sensing system is degraded to an extent where the status cannot be known.

An example of a method 1400 for operating a multi-sensor system, e.g., such as the multi-sensor systems depicted in FIGS. 9-11, is shown in FIG. 14. The multi-sensor system may be implemented in a differential assembly such as the differential assembly 2 of FIGS. 5-8 to monitor a position of a solenoid actuator of the differential assembly. Operation of a first and a second eddy current sensor of the multi-sensor system may be controlled by a microcontroller configured with executable instructions and energized by an ECU. Each of the eddy current sensors may have an operating range optimized to confirm two states of a differential locker actuated by the solenoid actuator. For example, a first sensor of the eddy current sensors may be configured to detect if the actuator (e.g., solenoid actuator) is in an engaged, locked state or a transition state, where the transition state is detected when the actuator is transitioning between the engaged state and a disengaged state. A second sensor of the eddy current sensors may be configured to detect if the actuator is in the disengaged, unlocked state or the transition state. Instructions for carrying out method 1400 may be executed by the microcontroller based on instructions stored on a memory of the microcontroller.

At 1402, the method includes energizing the first sensor and collecting data points. For example, the microcontroller may instruct the ECU to deliver a voltage to an oscillator of the first sensor when the multi-sensor system is the system of FIG. 9 or of FIG. 11. Furthermore, when the system is configured as shown in FIG. 11, with one switch adjustable to connect/disconnect the second sensor to the ECU, the switch may be maintained open while the first sensor is energized. Alternatively, when the system is the system of FIG. 10 with a shared oscillator and two switches, a first switch of the switches may be closed to connect the first sensor to the ECU. The oscillator may induce a first magnetic field at a resonant frequency of an inductive coil at the first sensor. As described previously, interference between a second magnetic field generated at a target, which may be positioned on a part of the differential assembly proximate to the actuator or at the actuator, and the first magnetic field may be used to infer a distance between the actuator and the target. The first magnetic field may be measured and the measurements stored as data points at the memory of the microcontroller.

At 1404, the method includes confirming if an amount of time elapsed since initiating data point collection from the first sensor reaches a first threshold. The first threshold may be a pre-set period of time, such as 10 ms. If the time elapsed does not reach the first threshold, the method returns to 1402 to continue collecting data points. If the time elapsed reaches the first threshold, the method continues to 1406 to confirm a state of the differential assembly.

For example, the distance between the actuator and the target may be inferred based on a number of the data points collected during the first threshold. In one example, the first sensor may collect between 30,000 to 40,000 data points, and the number of data points may be correlated to a relative position of the actuator. The relative position of the actuator may, in turn, be used to confirm the state of the differential assembly, e.g., engaged or transitioning, based on an output of the first sensor.

At 1408, the method includes energizing the second sensor and collecting data points from the second sensor via a similar process as described above for energizing the first sensor. For example, when the multi-sensor system is the system of FIG. 9, a voltage is delivered to an oscillator of the second sensor. If the multi-sensor system is the system of FIG. 10, the first switch may be opened and a second switch of the two switches may be closed to disconnect the first sensor and connect the second sensor to the shared oscillator. When the multi-sensor system is instead configured as the system of FIG. 11, the voltage may continue to be delivered to the first sensor via the oscillator and, additionally, a switch may be closed to also connect the second sensor to the oscillator. Inductances of each inductive coil of the first and second sensors may thereby be summed to allow the multi-sensor system to operate at a different range than a range of the first sensor.

At 1410, the method includes confirming if an amount of time elapsed since initiating data point collection from the second sensor reaches a second threshold. The second threshold may be the same preset duration of time as the first threshold. If the time elapsed does not reach the second threshold, the method returns to 1408 to continue collecting data points. If the time elapsed reaches the second threshold, the method continues to 1412 to confirm a state of the differential assembly.

For example, the distance between the actuator and the target may be inferred based on a number of the data points collected during the second threshold. In one example, the second sensor may collect between 50,000 to 60,000 data points, and the number of data points may be correlated to a relative position of the actuator. The relative position of the actuator may, in turn, be used to confirm the state of the differential assembly, e.g., disengaged or transitioning, based on an output of the second sensor.

At 1414, the method includes comparing the outputs of the first and second sensors and confirming if the outputs match, e.g., complement one another. For example, the outputs of the sensors may match when the first sensor indicates the actuator is engaged and the second sensor indicates the actuator is transitioning, confirming that the differential assembly is in the locked state. As another example, the outputs of the sensors may match when the first sensor indicates the actuator is transitioning and the second sensor indicates the actuator is disengaged, confirming that the differential assembly is in the unlocked state. In yet another example, the outputs of the sensors may match when both sensors indicate the actuator is transitioning, resulting in an inferred transition state of the differential assembly.

If the sensor outputs are confirmed to match, as described above, the method continues to 1418 to transmit the indicated actuator position and inferred differential assembly status to a vehicle controller, e.g., a powertrain control module. Current operation of the multi-sensor system continues and the method returns to the start.

If the first sensor indicates that the actuator is engaged and the second sensor concurrently indicates that the actuator is disengaged, however, the sensor outputs may be deemed to not match as both conditions cannot be simultaneously true. A fault in the multi-sensor system may be present and the method includes indicating the fault to an operator at 1416. A notification may be provided regarding a fault at the multi-sensor system, such as a MIL, a message displayed at the dashboard user interface, etc. The method ends.

In some instances, the multi-sensor system may be configured with various self-diagnostics to increase an accuracy of the multi-sensor system with respect to representing a true system state. The self-diagnostics may include, for example, determination of which oscillator may be degraded (when more than one oscillator is included), degradation of a temperature sensor, a lack of calibration measurements stored in memory or inconsistency in the calibration measurements, degradation of the reference clock, inability to switch between eddy current sensors, loss of memory storage, and degradation at a processor of the microcontroller or ECU. In some examples, if one oscillator is degraded and the other is intact, operation of the multi-sensor system may continue relying on an output from only the sensor with the non-degraded oscillator.

The fault at the multi-sensor system may also be indicated if either of the first sensor or the second sensor generates a current signal outside of boundaries of each of a low current signal and a high current signal, as described above with reference to FIGS. 9-11. In some examples, the multi-sensor system and use of the differential assembly may be disabled in response to detection of the fault. Alternatively, in other examples, operation of the actuator and differential assembly may continue without relying on the multi-sensor system to confirm the state of the differential assembly.

In this way, a multi-sensor system may allow a position of an actuator of a differential assembly, and therefore a status of the differential assembly, to be realized with greater accuracy than a single sensor system. Each of the two sensors may be configured to detect two positions of a differential locker, and three states overall of the differential assembly, e.g., engaged, disengaged, and transitioning. Furthermore, a redundancy provided by two eddy current sensors of the multi-sensor system may enhance a robustness of the system in instances where one of the sensors becomes degraded.

FIGS. 1-8 and 12 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements coaxial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Elements having a continuous shape may be referred to as such, in on example. Further in another example, elements having a monolithic shape may be referred to as such. As used herein, the terms "substantially" and "approximately" are construed to mean plus or minus five percent or less of the range or value unless otherwise specified.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various vehicle system configurations. The control methods and routines disclosed herein may be stored as executable instructions in non-transitory memory and may be carried out by the control system including the controller in combination with the various sensors, actuators, and other system hardware. The specific routines described herein may represent one or more of any number of processing strategies. As such, various commands, operations, and/or actions described herein may be performed in the sequence illustrated, in tandem, or in some cases omitted. Likewise, the order of processing is provided for ease of description and is not necessarily required to achieve the features and advantages of the examples described herein. One or more of the actions, operations, and/or functions, described herein may be repeatedly performed depending on the particular strategy being used. Further, the described actions, operations, and/or functions may graphically represent code to be programmed into non-transitory memory of the computer readable storage medium in a differential control system, where the described actions are carried out by executing the instructions in a system including the various hardware components in combination with the electronic controller.

It will be appreciated that the configurations and routines disclosed herein are exemplary in nature, and that these specific examples are not to be considered in a limiting sense, because numerous variations are possible. For example, the above technology may be applied to motor systems with different configurations and in a vehicle with a variety of propulsion sources such as motors, engines, combinations thereof, etc. Moreover, the terms "first," "second," "third," and the like are not intended to denote any order, position, quantity, or importance, but rather are used merely as labels to distinguish one element from another, unless explicitly stated to the contrary. The subject matter of the present disclosure includes all novel and non-obvious combinations and sub-combinations of the various systems and configurations, and other functions, features, and/or properties disclosed herein.

The disclosure also provides support for a differential system, comprising: an electromagnetic solenoid actuator, including a coil assembly and a piston, the electromagnetic solenoid actuator configured to selectively induce locking and unlocking of axle shaft speed differentiation, a sensor sub-assembly including at least two sensor units that are each configured to sense a position of the piston, and a circuit assembly configured to programmatically control the electromagnetic solenoid actuator and including control circuitry. In a first example of the system, at least one of the at least two sensor units is an eddy current sensor. In a second example of the system, optionally including the first example, at least another of the at least two sensor units is a solenoid induction sensor. In a third example of the system, optionally including one or both of the first and second examples, the at least two sensor units include at least two eddy current sensors. In a fourth example of the system, optionally including one or more or each of the first through third examples, the circuit assembly includes executable instructions stored in non-transitory memory that cause the circuit assembly to send a circuit board state update to a vehicle controller. In a fifth example of the system, optionally including one or more or each of the first through fourth examples, the sensor sub-assembly radially extends down a face of the coil assembly, and wherein the sensor sub-assembly is arranged perpendicular to the control circuitry. In a sixth example of the system, optionally including one or more or each of the first through fifth examples, the circuit assembly includes a continuous base that comprises an upper section and a side section that radially extends towards a central axis of the differential system from the upper section.

The disclosure also provides support for a locking differential system, comprising: a driving gear, a differential drive with an input part and two output parts, wherein the two output parts are drivingly connected to the input part and, relative to one another, have a differential effect, a coupling effectively arranged between the driving gear and the differential drive, wherein, in a closed condition of the coupling, torque is transmitted from the driving gear to the differential drive and, in an open condition of the coupling, a transmission of torque is interrupted, a controllable actuator for actuating the coupling, wherein the actuator comprises an electromagnet and an axially displaceable piston, and wherein the actuator is configured to generate a current signal representing a coil current of the electromagnet, and a multi-sensor sub-assembly having two eddy current sensors coupled to a common microcontroller, wherein each eddy current sensor is configured to generate a sensor signal representing a first, engaged position or a second, disengaged position of the coupling, but with each of the two eddy current sensors switching between their respective indications at different physical positions. In a first example of the system, the two eddy current sensors includes a first eddy current sensor with a first inductive coil and a second eddy current sensor with a second inductive coil and wherein each of the first inductive coil and the second inductive coil is formed of a pair of coils stacked along a first axis. In a second example of the system, optionally including the first example, the first inductive coil and the second inductive coil are stacked along the first axis. In a third example of the system, optionally including one or both of the first and second examples, the first inductive coil is inserted between the pair of coils of the second inductive coil. In a fourth example of the system, optionally including one or more or each of the first through third examples, the first inductive coil and the second inductive coil are arranged adjacent to one another and co-planar. In a fifth example of the system, optionally including one or more or each of the first through fourth examples, the multi-sensor sub-assembly includes a first oscillator configured to activate the first inductive coil and a second oscillator configured to activate the second inductive coil, and wherein operation of the multi-sensor sub-assembly includes switches between activating the first inductive coil and the second inductive coil. In a sixth example of the system, optionally including one or more or each of the first through fifth examples, the multi-sensor sub-assembly includes one oscillator electrically coupled to the first inductive coil via a first switch and electrically coupled to the second inductive coil via a second switch, and wherein operation of the multi-sensor sub-assembly includes toggling closing of the first switch and closing of the second switch. In a seventh example of the system, optionally including one or more or each of the first through sixth examples, the multi-sensor sub-assembly includes one oscillator constantly connected to the first inductive coil and selectively coupled to the second inductive coil via a switch, and wherein operation of the multi-sensor sub-assembly includes toggling opening and closing of the switch.

The disclosure also provides support for a method for a differential system, comprising: monitoring a piston of a solenoid actuator based on signals from multi-sensors of a multi-sensor sub-assembly, wherein each of the multi-sensors is an eddy current sensor configured to identify a state of the piston amongst three possible states. In a first example of the method, monitoring the piston includes receiving a first set of data from a first eddy current sensor of the multi-sensors and a second set of data from a second eddy current sensor of the multi-sensors and confirming the state of the piston when the first set of data and the second set of data are complementary. In a second example of the method, optionally including the first example, confirming the state of the piston when the first set of data and the second set of data are complementary includes one of inferring the piston is in a locked state when the first set of data indicates the piston is locked and the second set of data indicates the piston is transitioning, inferring the piston is in an unlocked state when the first set of data indicates the piston is transitioning and the second set of data is unlocked, and inferring the piston is in a transition state when both the first set of data and the second set of data indicate the piston is transitioning. In a third example of the method, optionally including one or both of the first and second examples, the method further comprises: confirming a fault condition at the multi-sensor sub-assembly when the first set of data indicates the piston is locked and the second set of data indicates the piston is unlocked. In a fourth example of the method, optionally including one or more or each of the first through third examples, the method further comprises: confirming a fault condition at the multi-sensor sub-assembly when one or more of the first eddy current sensor and the second eddy current sensor generates a current signal with a magnitude outside of predetermined boundaries of current signal ranges.

The following claims particularly point out certain combinations and sub-combinations regarded as novel and non-obvious. These claims may refer to "an" element or "a first" element or the equivalent thereof. Such claims should be understood to include incorporation of one or more such elements, neither excluding nor requiring two or more such elements. Other combinations and sub-combinations of the disclosed features, functions, elements, and/or properties may be claimed through amendment of the present claims or through presentation of new claims in this or a related application. Such claims, whether narrower, broader, equal, or different in scope to the original claims, also are regarded as included within the subject matter of the present disclosure.

The invention claimed is:

1. A locking differential system, comprising:
a driving gear;
a differential drive with an input part and two output parts, wherein the two output parts are drivingly connected to the input part and, relative to one another, have a differential effect;
a coupling effectively arranged between the driving gear and the differential drive, wherein, in a closed condition of the coupling, torque is transmitted from the driving gear to the differential drive and, in an open condition of the coupling, the transmission of torque is interrupted;
a controllable actuator for actuating the coupling, wherein the actuator comprises an electromagnet and an axially displaceable piston, and wherein the actuator is configured to generate a current signal representing a coil current of the electromagnet; and
a multi-sensor sub-assembly having two eddy current sensors coupled to a common microcontroller, wherein each eddy current sensor is configured to generate a sensor signal representing a first, engaged position or a second, disengaged position of the coupling, but with each of the two eddy current sensors switching between their respective indications at different physical positions;
wherein the two eddy current sensors include a first eddy current sensor with a first inductive coil and a second eddy current sensor with a second inductive coil, and wherein each of the first inductive coil and the second inductive coil is formed of coils stacked along a first axis; and wherein the multi-sensor sub-assembly includes a first oscillator configured to activate the first inductive coil and a second oscillator configured to activate the second inductive coil, and wherein operation of the multi-sensor sub-assembly includes switching between activating the first inductive coil and the second inductive coil.

2. The locking differential system of claim 1, wherein the first inductive coil and the second inductive coil are arranged adjacent to one another and co-planar.

3. A locking differential system, comprising:
  a driving gear;
  a differential drive with an input part and two output parts, wherein the two output parts are drivingly connected to the input part and, relative to one another, have a differential effect;
  a coupling effectively arranged between the driving gear and the differential drive, wherein, in a closed condition of the coupling, torque is transmitted from the driving gear to the differential drive and, in an open condition of the coupling, the transmission of torque is interrupted;
  a controllable actuator for actuating the coupling, wherein the actuator comprises an electromagnet and an axially displaceable piston, and wherein the actuator is configured to generate a current signal representing a coil current of the electromagnet; and
  a multi-sensor sub-assembly having two eddy current sensors coupled to a common microcontroller, wherein each eddy current sensor is configured to generate a sensor signal representing a first, engaged position or a second, disengaged position of the coupling, but with each of the two eddy current sensors switching between their respective indications at different physical positions;
  wherein the two eddy current sensors include a first eddy current sensor with a first inductive coil and a second eddy current sensor with a second inductive coil, and wherein each of the first inductive coil and the second inductive coil is formed of coils stacked along a first axis; and
  wherein the multi-sensor sub-assembly includes one oscillator electrically coupled to the first inductive coil via a first switch and electrically coupled to the second inductive coil via a second switch, and wherein operation of the multi-sensor sub-assembly includes toggling closing of the first switch and closing of the second switch.

4. The locking differential system of claim 3, wherein the first inductive coil and the second inductive coil are arranged adjacent to one another and co-planar.

5. A locking differential system, comprising:
  a driving gear;
  a differential drive with an input part and two output parts, wherein the two output parts are drivingly connected to the input part and, relative to one another, have a differential effect;
  a coupling effectively arranged between the driving gear and the differential drive, wherein, in a closed condition of the coupling, torque is transmitted from the driving gear to the differential drive and, in an open condition of the coupling, the transmission of torque is interrupted;
  a controllable actuator for actuating the coupling, wherein the actuator comprises an electromagnet and an axially displaceable piston, and wherein the actuator is configured to generate a current signal representing a coil current of the electromagnet; and
  a multi-sensor sub-assembly having two eddy current sensors coupled to a common microcontroller, wherein each eddy current sensor is configured to generate a sensor signal representing a first, engaged position or a second, disengaged position of the coupling, but with each of the two eddy current sensors switching between their respective indications at different physical positions;
  wherein the two eddy current sensors include a first eddy current sensor with a first inductive coil and a second eddy current sensor with a second inductive coil, and wherein each of the first inductive coil and the second inductive coil is formed of coils stacked along a first axis; and
  wherein the multi-sensor sub-assembly includes one oscillator constantly connected to the first inductive coil and selectively coupled to the second inductive coil via a switch, and wherein operation of the multi-sensor sub-assembly includes toggling opening and closing of the switch.

6. The locking differential system of claim 5, wherein the first inductive coil and the second inductive coil are arranged adjacent to one another and co-planar.

* * * * *